United States Patent [19]
Mitsuno

[11] Patent Number: 5,717,670
[45] Date of Patent: Feb. 10, 1998

[54] INFORMATION COMPACTING METHOD AND APPARATUS, COMPACTED INFORMATION EXPANDING METHOD AND APPARATUS, COMPACTED INFORMATION RECORDING/TRANSMITTING APPARATUS, COMPACTED INFORMATION RECEIVING APPARATUS AND RECORDING MEDIUM

[75] Inventor: Makoto Mitsuno, Chiba, Japan

[73] Assignee: Sony Corporation, Japan

[21] Appl. No.: 491,973

[22] PCT Filed: Nov. 29, 1994

[86] PCT No.: PCT/JP94/02005
§ 371 Date: Jul. 21, 1995
§ 102(e) Date: Jul. 21, 1995

[87] PCT Pub. No.: WO95/15032
PCT Pub. Date: Jun. 1, 1995

[30] Foreign Application Priority Data

Nov. 29, 1993 [JP] Japan ................... 5-298304

[51] Int. Cl.$^6$ ................... G11B 7/00
[52] U.S. Cl. ................... 369/48; 369/49; 369/58; 369/59
[58] Field of Search ................... 369/48, 49, 50, 369/47, 54, 58, 59, 60, 32, 124; 360/48, 51

[56] References Cited

U.S. PATENT DOCUMENTS 5,587,978  12/1996  Endo et al. ................... 369/49 X
5,615,187   3/1997  Shinada ................... 369/48

FOREIGN PATENT DOCUMENTS 63-182700  7/1988  Japan ................... G10L 9/16
5-52332    3/1991  Japan ................... H03M 7/30

OTHER PUBLICATIONS

IEICE Thesis Journal vol. J71-A, No. 2, Feb. 25, 1988 (25.02.88), Corp. IEICE pp. 443-452.

Primary Examiner—Muhammad N. Edun
Attorney, Agent, or Firm—Limbach & Limbach LLP

[57] ABSTRACT

Digital audio data of at least two channels are orthogonal-transformed by orthogonal transform for effecting bit compaction. If, when the time length and window shape of the orthogonal transform block is changed, the correlation between channels is found to be high to a certain extent, the time lengths of the orthogonal transform blocks in each channel is selected to be equal to suppress the difference in sound quality between channels to improve a fixed sound image position feeling and hence a high sound quality. This allows to produce a high sound quality for the same bit rate. A lower bit rate may be used for producing the equivalent sound quality. A method for determining the time length of a processing block which is psychoacoustically more desirable processing block may be provided to enable high efficiency compaction and expansion with a psychoacoustically optimum sound quality.

37 Claims, 13 Drawing Sheets

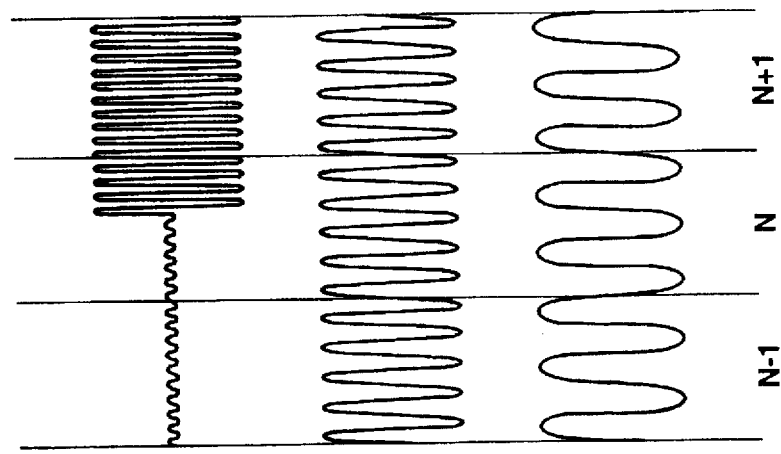
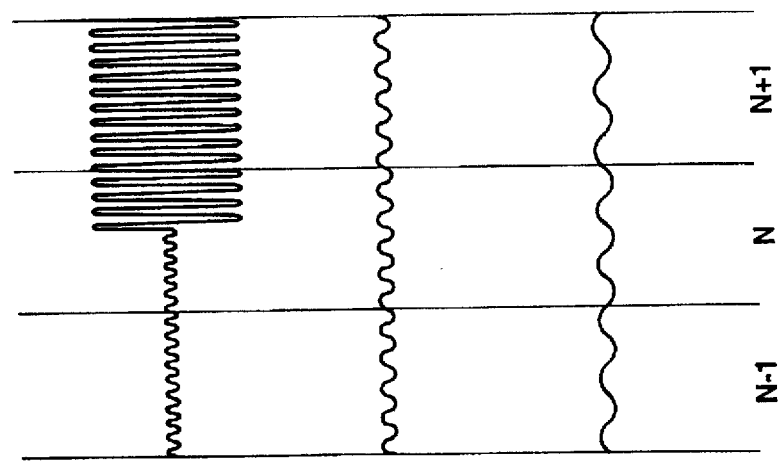
FIG. 7A  22kHz ~11kHz
FIG. 7B  11kHz ~5.5kHz
FIG. 7C  5.5kHz ~0kHz
FIG. 7D
FIG. 7E
FIG. 7F

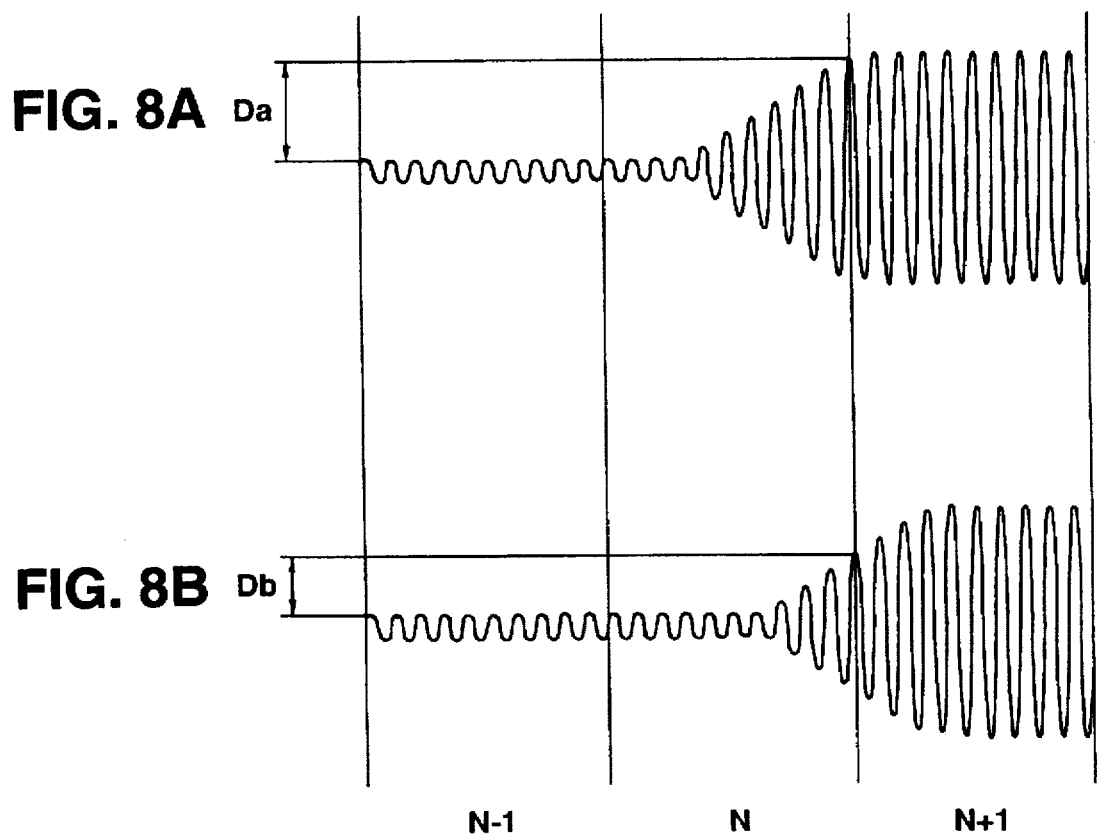

INFORMATION COMPACTING METHOD AND APPARATUS, COMPACTED INFORMATION EXPANDING METHOD AND APPARATUS, COMPACTED INFORMATION RECORDING/TRANSMITTING APPARATUS, COMPACTED INFORMATION RECEIVING APPARATUS AND RECORDING MEDIUM

TECHNICAL FIELD

This invention relates to a method and apparatus for bit compacting e.g., digital audio signals, a method and apparatus for expanding the compacted information, a method and apparatus for recording/transmitting the compacted information, a recording medium having the compacted information recorded thereon, an apparatus for reproducing the compacted information from a recording medium, and an apparatus for receiving the compacted information. More particularly, it relates to such method and apparatus for changing the time duration of a processing block depending on amplitude changes of an input signal waveform on the time axis.

BACKGROUND ART

The present Assignee has already proposed in e.g., U.S. Pat. No. 5,243,588 a technology of bit compacting input digital audio signals and recording them in a burst fashion on a recording medium with a pre-set data volume as a recording unit.

This technique employs a magneto-optical disc as a recording medium and records adaptive differential (AD) PCM audio data as prescribed in the audio data formats of the CD-interactive (CD-I) or CD-ROM on the magneto-optical disc while reproducing the ADPCM audio data from the magneto-optical disc. The ADPCM audio data are recorded in a burst fashion on the magneto-optical disc with e.g., 32 sectors of the ADPCM audio data and a few linking sectors for an interleaving operation.

As for the ADPCM audio data in the recording/reproducing apparatus employing the magneto-optical disc, several modes can be selected. For example, a level A, having a compaction ratio twice that of the reproducing time for usual compact disc (CD), with the sampling frequency being 37.8 kHz, a level B, having a four-fold compaction ratio, with the sampling frequency being 37.8 kHz, and a level C, having an eight-fold compaction ratio, with the sampling frequency being 18.9 kHz, are prescribed. That is, with the above level B, digital audio data are compacted to approximately one-fourth. The reproducing time or play time of the disc recorded with the level B is four times that of a standard CD format (CD-DA format). This reduces the size of the apparatus because the recording/reproducing time approximately equal to that of a smaller sized disc having a standard diameter of 12 cm can be achieved.

Meanwhile, since the speed of disc rotation of the recording/reproducing apparatus is the same as that of the standard CD, compacted data corresponding to the play time which is four times per unit time can be achieved for the level B. Thus the same compacted data is read four times in redundancy, with the time units of a sector or a cluster, and only one of the four times of reading is routed to audio reproduction. Specifically, track jump is carried out for returning to the original track position for each revolution during scanning or tracking a spirally-shaped recording track, so that the reproduction is carried out in such a manner that the same track is repeatedly tracked four times. Thus it suffices if regular compacted data is produced for at least one of the four times of readout attempts, so that the apparatus is strong against errors caused by disturbances or the like and hence may desirably be applied to a small-sized portable system.

It may also be contemplated to use a semiconductor memory as a recording medium. Specifically, it may be contemplated to record and/or reproduce audio signals using a so-called IC card. Compacted data obtained by bit compaction is recorded or reproduced on or from the IC card. Additional bit compaction is desirably carried out for further improving the compaction efficiency.

The IC card employing a semiconductor memory, for example, is increased in recording capacity or lowered in cost with progress in the semiconductor technology. In an initial stage in which the IC card has started to be offered to the market, it tends to be insufficient in capacity and expensive. Thus it is contemplated to transfer the contents of an other recording medium, which is less expensive and larger in capacity, such as the above-mentioned magneto-optical disc, to an IC card, a number of times, by way of rewriting. Specifically, desired ones of plural airs recorded on the magneto-optical disc are dubbed to the IC card and occasionally replaced by other airs. By frequently rewriting the contents of the IC card, a number of airs may be played outdoors even if only a small number of IC cards is owned by the user.

The present Assignee has proposed in U.S. Pat. No. P 5,197,087 a technique of improving the temporal resolution and response characteristics by varying processing blocks for compaction responsive to large amplitude changes in an input signal.

This technique resides in changing temporal resolution and frequency resolution responsive to characteristics of the input signal. In a so-called transform coding employing orthogonal transform, which is among the high efficiency compaction methods, the above technique is particularly effective against pre-echo which is produced when an input signal has rapid amplitude changes. The pre-echo herein means a phenomenon in which, if compaction and expansion are carried out while large amplitude changes are produced in an orthogonal transform unit, referred to hereinafter as an orthogonal transform block, temporally uniform quantization noise is produced in the orthogonal transform block and raises a problem on the human hearing sense at a small amplitude portion of the original signal.

Meanwhile, with the above-mentioned transform coding, if the time duration of the orthogonal transform block is protracted or shortened, the temporal resolution or the frequency resolution is lowered, due to characteristics of the orthogonal transform, respectively. For example, if the same signal is orthogonal transformed using orthogonal transform blocks of different time durations, the states of the resulting spectral signals or the orthogonal transform coefficients differ appreciably. Such difference is naturally reflected in the compacted or expanded signal. It is assumed that, for example, the input signal is the two-channel stereophonic music signal. While the lengths of the orthogonal transform blocks of respective channels are determined in general independently of each other, it may occur that the length of the orthogonal transform block of one of the channels is selected to be shorter, while that of the other channel is selected to be longer, despite the fact that two channels are moderately correlated with each other. In such case, a significant variation is produced in the states of the spectral signals or the orthogonal transform coefficients between the channels, as a result of which the difference in the sound quality between the channels becomes outstanding. This causes indefinite fixed sound image feeling of the music signals on expansion and deteriorated sound quality.

DISCLOSURE OF THE INVENTION

In view of the foregoing, it is an object of the present invention to provide a technique capable of determining an orthogonal transform block size optimally adapted to actual complex input signals and to prevent sound quality deterioration under low bit rate conditions as well as to improve the sound quality under the constant bit rate condition.

The present invention, proposed for achieving the above object, provides a method for compacting the information in which at least two input signals with each one channel are divided into processing blocks having lengths adaptively changed to the input signals of the respective channels, and information compaction is carried out on the processing block basis. The concurrent processing blocks of the respective channels are of equal lengths.

The present invention also provides an apparatus for information compaction comprising block dividing means for dividing input signals with at least two channels into processing blocks, with the processing block length being varied depending on the input signals of the respective channels and with the length of the concurrent processing blocks of the respective channels being the same, and means for compacting the information for processing block based signals.

The information compacting method and apparatus are designed in the following manner. That is, the lengths of the processing blocks for at least two of the channels are selected to be equal. With the information compacting method and apparatus of the present invention, signal correlation between at least two channels is checked and the lengths of the processing blocks on the respective channels are selected to be equal only when it is judged that the correlation is high. The correlation is checked based upon changes in the input signal of a processing block under consideration and/or changes in the input signal of an other processing block and/or the power or energy or peak information, and/or changes and/or the power or energy or peak information in the input signal of a concurrent processing block with the processing block under consideration, or changes in the input signal of each processing block concurrent with the processing block under consideration, and/or changes in the input signal of an other processing block and/or power or energy or peak information, or changes in the input signal of the processing block under consideration or at least one processing block neighboring to the processing block under consideration, and/or power or energy or peak information. The correlation is checked based upon changes n the input signal in the processing block under consideration of each channel and/or power or energy or peak information, or changes in the input signal of a processing block under consideration in each channel and/or power or energy or peak information or on the difference between channels of the power or energy or peak information. With the information compaction method and apparatus of the present invention, the degree of the pe-set masking effect responsive to the input signal is calculated to determine the length of the processing block of each channel. The degree of masking effect is calculated based upon changes in the input signal of the processing block under consideration and/or an other processing block and/or the power or energy or peak information, or calculated based upon changes in the input signal of the processing block neighboring to the processing block under consideration, and/or the power or energy or peak information, or calculated based upon changes in the input signal of a processing block concurrent to the block under consideration and/or power or energy or peak information. With the information compacting method and apparatus of the present invention, the ratio of participation in the decision of the element for determining the length of the processing block under consideration is fixed or adapted to the input signal or rendered variable with frequency. With the information compacting method and apparatus of the present invention, the time-domain signal is divided by orthogonal transform into plural bands on the frequency axis. The windowing function employed for orthogonal transform is changed in shape. For dividing the time-domain signal into plural bands on the frequency axis, the frequency spectrum is divided into plural bands, plural blocks each consisting of plural samples are orthogonal transformed to produce coefficient data. The bandwidth on the frequency axis are selected to be broader with increase in frequency and selected to be equal at at least two lowermost bands. With the information compacting method and apparatus of the present invention, the allocation of the main information and/or subsidiary information of compressed codes is inhibited for signal components of the bands approximately higher than the signal passband. When determining the time length of the processing blocks using the changes in the input signal of the processing block under consideration, the boundary value is variable depending on the amplitude and frequency of the input signal.

With a method for expanding the compacted information according to the present invention, the information compacted by the information compacting method or apparatus is expanded. If orthogonal transform is used for information compaction, inverse orthogonal transform is used for transforming the signal from plural bands on the frequency axis into time-domain signals. For transforming the signal from plural bands on the frequency axis into time-domain signals, inverse orthogonal transform is applied for each block of each band and the inverse orthogonal transform output are synthesized to produce a synthesized time-axis signal. The frequency width for synthesis from the plural bands on the frequency axis into the time-domain signal is selected to be broader with increase in frequency and be equal in at least two lowermost bands.

The present invention also provides an apparatus for expanding the compacted information responsive to the input signal of at least two channels and the compacted information of the respective channels is expanded on the basis of a concurrent processing block having a pre-set length for each channel. The apparatus has expanding means for performing expansion which is a counterpart operation of the compression for each channel, and synthesizing means for synthesizing the variable length processing blocks from the expansion means. The compacted information expanding method and apparatus of the present invention expands the information compacted by the information compacting method and apparatus.

In other words, the information compacting method and apparatus and the compacted information expanding method and apparatus (high efficiency encoding technique and compaction or expansion apparatus) are characterized by varying the time length of the orthogonal transform block in the course of compaction in conformity to amplitude changes in the input signal. The time length of the orthogonal transform block is determined based on the energy or power of the frequency band of an other channel in addition to the amplitude changes in the time-axis signal in the frequency range of the block under consideration, and/or the energy or power of the frequency domain of the other channel for calculating the masking effect on the orthogonal transform block under consideration if the signal correlation between the channels is high. If the masking effect can be realized, the total orthogonal transform block sizes of the respective channels are temporally long and equal to one another. If the masking effect cannot be realized, the total orthogonal transform block sizes of the respective channels are temporally short and equal to one another.

The present invention also provides a compacted information recording/transmitting apparatus having means for dividing the input signal of at least two channels into processing blocks, with the length of the processing block being variable responsive to the input signals of the respective channels and being constant for each concurrent processing block of each channel. The apparatus also has information compacting means for compacting the processing block based signal by pre-set information compaction, and recording/transmitting means for recording or transmitting the compacted information by the information compacting means. The compacted information obtained by the information compacting method and apparatus is recorded on a recording medium or transmitted on a transmission medium.

The present invention also provides a recording medium having the compacted information recorded thereon wherein processing blocks of at least two channels are variable in length in conformity to the input signal and the compacted information of each channel is recorded based on a processing block having the same length for the respective channels. The recording medium has recorded thereon the compacted information compacted by the information compacting method or apparatus of the present invention.

The compacted information reproducing apparatus of the present invention expands and reproduces the compacted information from the recording medium on which the compacted information is pre-recorded by the compacted information recording apparatus of the present invention. The compacted information receiving apparatus of the present invention receives and expands the compacted information transmitted from the compacted information transmitting apparatus of the present invention.

According to the present invention, if, when changing the time size of the orthogonal transform block and the window shape against acute changes in the input signal, the correlation between channels exist to a certain extent, the time length of the orthogonal transform block of each channel is selected to be equal to suppress sound quality difference between channels to improve a fixed sound image position feeling to provide a satisfactory sound quality.

Thus it becomes possible to achieve better sound quality for the same bit rate or to use a lower bit rate to achieve equivalent sound quality.

BRIEF DESCRIPTION OF THE DRAWINGS

FIGS. 7A–7F illustrate the pre-echo masking effect in the block decision circuit.

FIGS. 8A and 8B illustrate orthogonal transform block size decision in the block length decision circuit add the correlation among the channels.

BEST MODE FOR CARRYING OUT THE INVENTION

Figure 1:
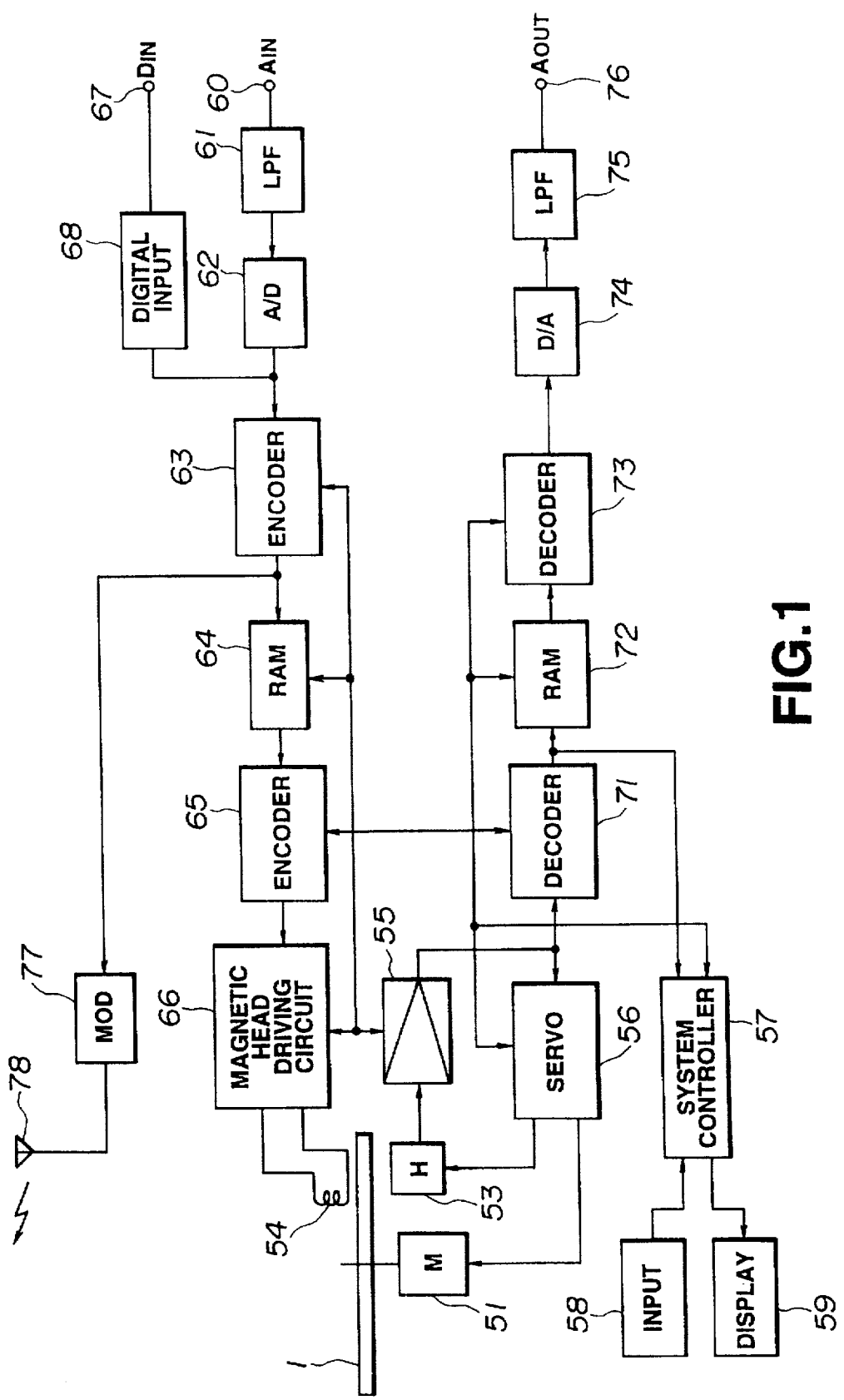
FIG. 1 is a block circuit diagram showing an illustrative arrangement of a compacted data recording/reproducing apparatus embodying the present invention.

Referring to the drawings, an illustrative embodiment of the present invention will be explained in detail.

In FIG. 1, an arrangement of a compacted data recording/reproducing apparatus employing an information compaction method and apparatus and a compacted information expanding method and apparatus according to the present invention is shown in a block circuit diagram.

In the compacted data recording/reproducing apparatus, shown in FIG. 1, a magneto-optical disc 1, run in rotation by a spindle motor 51, is employed as a recording medium. With the present compacted data recording/reproducing apparatus, data is recorded along a recording track of the magneto-optical disc 1 during data recording on the magneto-optical disc 1 by so-called magnetic field modulation in which a magnetic field modulated in dependence upon the recording data is applied by a magnetic head 54 whilst a laser light is radiated by an optical head 53. With the present compacted data recording/reproducing apparatus, the recording track on the magneto-optical disc 1 is traced with a laser light of the optical head 53 during data reproduction for photomagnetically reproducing data.

Specifically, the optical head 53 is made up of optical components, such as a laser light source, e.g., a laser diode, a collimator lens, an objective lens, a polarization beam splitter or a cylindrical lens, a photodetector having a light receiving section of a pre-set pattern, and so forth. The optical head 53 is mounted facing the magnetic head 54 with the magneto-optical disc 1 in-between. For recording data on the magneto-optical disc 1, the magnetic head 54 is driven by a head driving circuit 66 of the recording system as later explained for impressing the modulated magnetic field modulated in accordance with the recording data, while the laser light is radiated on a target track of the magneto-optical disc 1 by the optical head 53 for achieving thermomagnetic recording in accordance with the magnetic field modulation system. On the other hand, the optical head 53 detects the laser light reflected from the target track after irradiation for detecting the focusing error by e.g. a so-called astigmatic method and the tracking error by a so-called push-pull method. When reproducing data from the magneto-optical disc 1, the optical head 53 detects the focusing error and the tracking error, at the same time as it detects the difference in the polarization angle (Kerr rotation angle) of the reflected laser light from the target track.

An output of the optical head 53 is fed to an RF circuit 55. The RF circuit 55 extracts the focusing error and the tracking error from an output of the optical head 53 and transmits the extracted signal to a servo control circuit 58. The RF circuit also converts the reproduced signal into a hi-level signal which is supplied to a decoder of a reproducing system as later explained.

The servo control circuit 56 is made up e.g., of a focusing servo control circuit, a tracking servo control circuit, a spindle motor servo control circuit and a thread servo control circuit. The focusing servo control circuit focusing controls an optical system of the optical head 53 so that the focusing error signal will be reduced to zero. The tracking servo control circuit tracking controls the optical system of the optical head 53 so that the tracking error signal will be reduced to zero. The spindle motor servo control circuit controls a spindle motor 51 so that the magneto-optical disc 1 will be run in rotation at a pro-set rotational velocity, such as at a constant linear velocity. The thread servo control circuit causes the optical head 53 and the magnetic head 54 to be moved to a target track position of the magneto-optical disc 1 as designated by a system controller 57. The servo control circuit 56, effectuating these various control operations, transmits the information indicating the operating states of various components controlled by the servo control circuit 56 to the system controller 57.

To the system controller 57 are connected a key input unit 58 and a display unit 59. The system controller 57 controls the recording system and the reproducing system with the operating mode designated by the actuating input information entered from the key input unit 58. The system controller 57 also controls the recording position and the reproducing position on the recording track traced by the optical head 53 and the magnetic head 54 based upon the sector-based address information reproduced from the recording track of the magneto-optical disc 1 as so-called header time or sub-code Q data. The system controller 57 also causes the reproducing time to be displayed on a display unit 59 based upon the data compaction ratio and the information on the reproducing position on the recording track.

For displaying the reproducing time, the sector-based address information (absolute time information) reproduced from the recording track of the magneto-optical disc 1 as the header time or the sub-code Q data is multiplied by a reciprocal of the data compaction ratio, which is equal to 4 for the 1/4 compaction, for finding the actual time information, which is displayed on the display unit 59. If the absolute time information is pre-recorded (pre-formatted) on the recording track of the magneto-optical disc 1, the current position may be also displayed in terms of the actual recording time during recording by reading out the pre-formatted absolute time information.

The recording system of the present compacted data recording/reproducing apparatus is hereinafter explained.

An analog audio input signal AIN from an input terminal 80 is supplied via a low-pass filter 81 to an A/D converter 82. The A/D converter 82 quantizes the analog audio input signal AIN into a quantized signal, that is into e.g., a 16-bit digital audio signal. The digital audio signal from the A/D converter 62 is fed to an adaptive transform encoder (ATC) 63.

To the ATC encoder 63 is fed a digital audio input signal DIN from an input terminal 67 via a digital interfacing circuit 68. The ATC encoder 63 effectuates bit compaction (data compression) on the digital audio signal of a pre-set transfer rate which is the analog audio signal AIN quantized by the A/D converter 62. Although the following description is made for the compaction ratio of 4, the present embodiment is not limited to the value of the compaction ratio which may be optionally selected according to the usage and application.

A memory 64, controlled as to data writing and data readout by the system controller 57, is employed as a buffer memory for temporally storing a compacted digital audio signal from the ATV encoder 63, hereinafter referred to as ATC audio data, and for recording the stored data on the magneto-optical disc 1 whenever the necessity arises. That is, the ATC audio data, supplied from e.g., the ATC encoder 63, has the data transfer rate reduced to about one-fourth of the data transfer rate of the standard CD-DA format of 75 sectors per second, that is to 18.75 sector per second. It is this ATC audio data that is continuously recorded in the memory 64. Although it suffices to record the ATC audio data at a rate of one of four sectors, as previously explained, sector-continuous recording is made, as will be explained later, because recording of every fourth sector is virtually infeasible. The recording is made in a burst fashion, with the interposition of a non-recording period, at the same data transfer rate of 75 sectors per second as the standard CD-DA format, with a pre-set plurality of sectors, for example, 32 plus a few sectors, or a cluster, as a recording unit. That is, in the memory 84, the ATC audio data, continuously written at a low transfer rate of 18.75 (=75/4) sectors per second corresponding to the above-mentioned bit compaction rate, is read out as recording data in a burst fashion at the above-mentioned transfer rate of 75 sectors per second. As for the thus read-out and recorded ATC audio data, the overall data transfer rate, inclusive of the non-recording period, is the above-mentioned low rate of 18.75 sectors per second. However, the instantaneous data transfer rate within the time of the burst-like recording is the above-mentioned standard rate of 75 sectors per second. Thus, if the rotational speed of the disc is equal to that of the standard CD-DA format, that is the constant linear velocity, the recording may be made at the same recording density or recording pattern as that of the CD-DA format.

The ATC audio data, that is the recorded data, read out from the memory 84 in a burst fashion at the above-mentioned instantaneous transfer rate of 75 sectors per second, is supplied to the encoder 65. In the data string supplied from the memory 64 to the encoder 65, the unit of continuous recording for each recording is a cluster composed of plural (e.g., 32) sectors, and a few cluster-linking sectors arrayed ahead and at back of the cluster. The cluster-linking sectors are set so as to be longer than the interleaving length at the encoder 85, such that data of other clusters is not affected by the interleaving operation.

The encoder 85 effectuates error correction coding, such as parity appendage and interleaving, or EHM encoding, on the recording data supplied thereto in a burst fashion from the memory 84. The recording data thus encoded by the encoder is supplied to a magnetic head driving circuit 88. The magnetic head driving circuit 88 is connected to the magnetic head 54 and drives the magnetic head 54 for applying a modulated magnetic field corresponding to the recording data to the magneto-optical disc 1.

The system controller 57, controlling the memory 64 as described above, controls the recording position so that the recording data read out in a burst fashion from the controlled memory 64 will be continuously recorded on the recording track of the magneto-optical disc 1. The recording position control is achieved by checking the recording position of the recording data read out in a burst fashion from the memory 64 under control by the system controller 57 for supplying a control signal designating the recording position on the recording track of the magneto-optical disc 1 to the servo control circuit 56.

The reproducing system for the compacted data recording/reproducing apparatus is now explained. The reproducing system is designed to reproduce the recording data continuously recorded on the recording track of the magneto-optical disc 1 by the above-described recording system. Thus the reproducing system has the above-mentioned RF circuit 55 for converting the playback output, obtained on tracing the recording track of the magneto-optical disc 1 by the optical head 53 by a laser light beam, into a bi-level signal, and a decoder 71 for decoding the bi-level playback signal. Meanwhile, it is possible with the present reproducing system to read out not only the magneto-optical disc 1 but also a replay-only optical disc, such as a compact disc (CD).

The decoder 71, which is a counterpart device of the encoder 65 of the above-described recording system, effectuates decoding for error correction and EFM decoding on the bi-level playback signals from the RF circuit 55, and reproduces the ATC audio data at a transfer rate of 75 sectors per second which is faster than the regular transfer rate. The playback data from the decoder 71 is supplied to a memory 72.

The memory 72 is controlled as to data writing and data readout by the system controller 57 such that the playback data supplied from the decoder 71 at the transfer rate of 75 sectors per second is written therein in a burst fashion at the transfer rate of 75 sectors per second. On the other hand, the playback data written in a burst fashion in the memory 72 at the transfer rate of 75 sectors per second is continuously read out from the memory 72 at the regular transfer rate of 75 sectors per second.

That is, the system controller 57 controls the memory 72 so that the playback data will be written therein at the transfer rate of 75 sectors per second and so that the playback data will be continuously written therefrom at the above-mentioned transfer rate of 18.75 sectors per second. The system controller 57, controlling the memory 72 as described above, also controls the playback position so that the playback data written in a burst fashion from the controlled memory 72 will be continuously reproduced from the recording track of the magneto-optical disc 1. The playback position control is made by the system controller 57 controlling the playback position of the playback data read out in a burst fashion from the memory 72 for supplying a control signal designating the playback position on the recording track of the magneto-optical disc 1 to the servo control circuit The playback data, that is the ATC audio data, continuously read out from the memory 72 at the transfer rate of 18.75 sectors per second, is supplied to an ATC decoder 73. The ATC decoder 73 expands the ATC audio data four-fold by bit expansion for regenerating e.g., 16-bit a digital audio signal (digital audio data), which is supplied to an A/D converter 74.

The D/A converter 74 converts the digital audio data supplied from the ATC decoder 73 into an analog signal to form an analog audio output signal AOUT. The analog audio output signal AOUT from the D/A converter 74 is outputted at an output terminal 76 via a low-pass filter 75.

Meanwhile, the present compacted data recording/reproducing apparatus is designed for converting the ATC audio data from the ATC encoder 63 into data of a pre-set transmission format by a modulator 77 for transmission over an antenna 78.

The high efficiency compaction encoding, employing the information compaction method according to the present invention, is now explained. Specifically, the technique of high efficiency encoding an input digital signal, such as audio PCM signal, by a sub-band coding (SBC), adaptive transform coding (ATC) and adaptive bit allocation, is now explained by referring to FIG. 2 ff.

Figure 2:
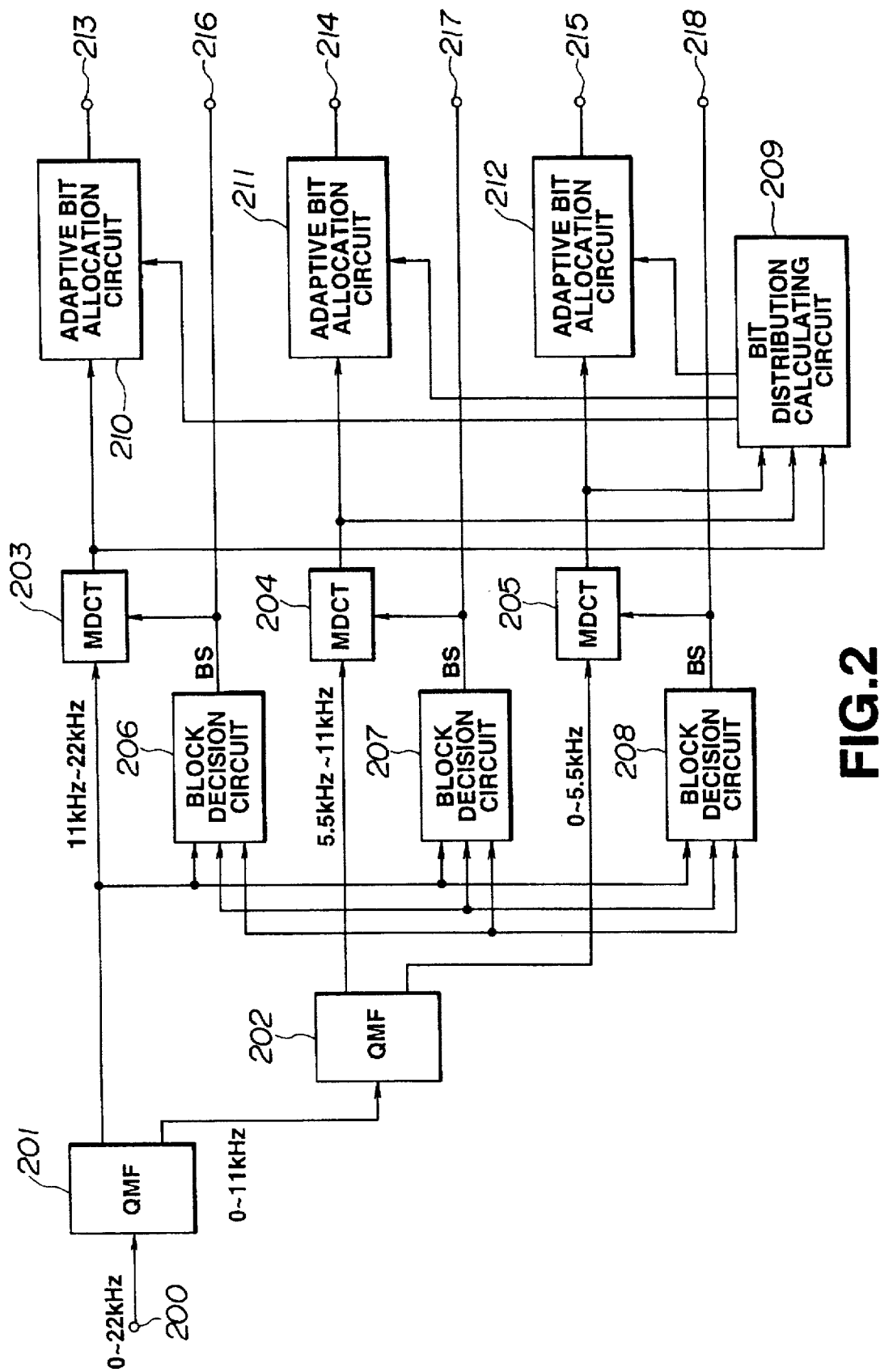
FIG. 2 is a block circuit diagram showing an illustrative arrangement of a high efficiency compaction encoding apparatus embodying the present invention.

In the illustrative high efficiency encoding device, shown in FIG. 2, the input digital signal is split int plural frequency bands so that two lowermost neighboring bands will be of an equal bandwidth and so that the bandwidth will become broader with increase in frequency. The input digital signal is then orthogonal transformed on the band basis. The resulting frequency-domain spectral data is encoded by adaptive bit allocation according to so-called critical bands for taking into account the psychoacoustic characteristics of the human auditory system for the low frequency range and according to sub-bands further divided from the critical bands for taking into account the block floating efficiency for the mid to high frequency range. These blocks usually become the blocks subjected to quantization noise. In the present embodiment, the block size for orthogonal transform is adaptively changed before orthogonal transform responsive to the input signal, while block-based floating is performed. FIG. 2 shows a circuit arrangement for encoding a 1-channel input digital signal.

Referring to FIG. 2, plural-channel audio PCM signals having a frequency range of from 0 to 22 kHz, with the sampling frequency of 44.1 kHz, are supplied to an input terminal 200. The input signal is divided by a band splitting filter 201, such as QMF, into a signal having a range of from 0 to 11 kHz and a signal having a range of from 11 kHz to 22 kHz. The signal in the range of from 0 to 11 kHz is further divided by a band splitting filter 202, such as QMF, into a signal having a range of from 0 to 5.5 kHz and a signal having a range of from 5.5 kHz to 11 kHz. The 11 to 22 kHz range signal from the band-splitting filter 201 is supplied to a modified DCT circuit 203, which is a sort of an orthogonal transform circuit, for modified DCT processing. Similarly, the 5.5 kHz to 11 kHz range signal from the band splitting filter 202 is supplied to a modified DCT circuit 204, while the 0 to 5.5 kHz range signal from the band-splitting filter 202 is supplied to a modified DCT circuit 205, for MDCT processing, respectively.

Among the techniques of dividing the input digital signal int plural frequency ranges is the above-mentioned QMF filter, as discussed in R. E. Crochiere, Digital Coding of Speech in Subbands Bell Tech. J. Vol.55, No.8, 1978. The technique of dividing the frequency spectrum into frequency bands of an equal bandwidth is discussed in J. H. Rothweiler, Polyphase Quadrature Filters- A New Subband Coding Technique, ICASSP 83, Boston. Among the techniques for orthogonal transform, there is a technique of dividing the input audio signal into frames each of a pre-set time duration and processing the resulting blocks with fast Fourier transform (FFT) or discrete cosine transform (DCT) for transforming the signal from the time axis into the frequency axis. Discussion of MDCT may be found in J. P. Princen and A. B. Bradley, University of Surrey Royal Melbourne Inst. of Tech., Subband/Transform Coding Using Filter Bank Designs Based on Time Domain Aliasing Cancellation, ICASSP 1987.

FIG. 3 shows illustrative examples of band-based blocks of a standard input signal supplied to the respective MDCT circuits 203 to 205, In the illustrative example of FIG. 3, each of the signals in the respective bands has its unique orthogonal transform block size and may have its time resolution switched depending upon time characteristics and frequency distribution proper to the signals. If the signal is temporally quasi-stationary, the orthogonal transform block size is set to 11.6 mS, as shown in FIG. 3A (long mode). If the signal is non-stationary, the orthogonal block size is further divided in two or four portions. The orthogonal transform block size is equally divided into four portions each being 2.6 mS as shown in FIG. 3B for the short mode or the orthogonal transform block size is partially divided in two portions each being 5.8 mS and partially into four portions each being 2.9 mS as shown in FIG. 3C for the middle mode A or in FIG. 3D for the middle mode B, respectively, in order to cope with the actual complex input signal. Meanwhile, the orthogonal transform block size division may be increased in number and/or pattern in order to cope with the input signal more flexibly. The orthogonal transform block size is determined by block size decision circuits 208 to 205 of FIG. 2. The orthogonal transform block size thus determined is supplied to the MDCT circuits 203 to 205 and thence outputted as the block size information of the respective blocks at output terminals 216, 217 and 218, respectively.

Figure 4:
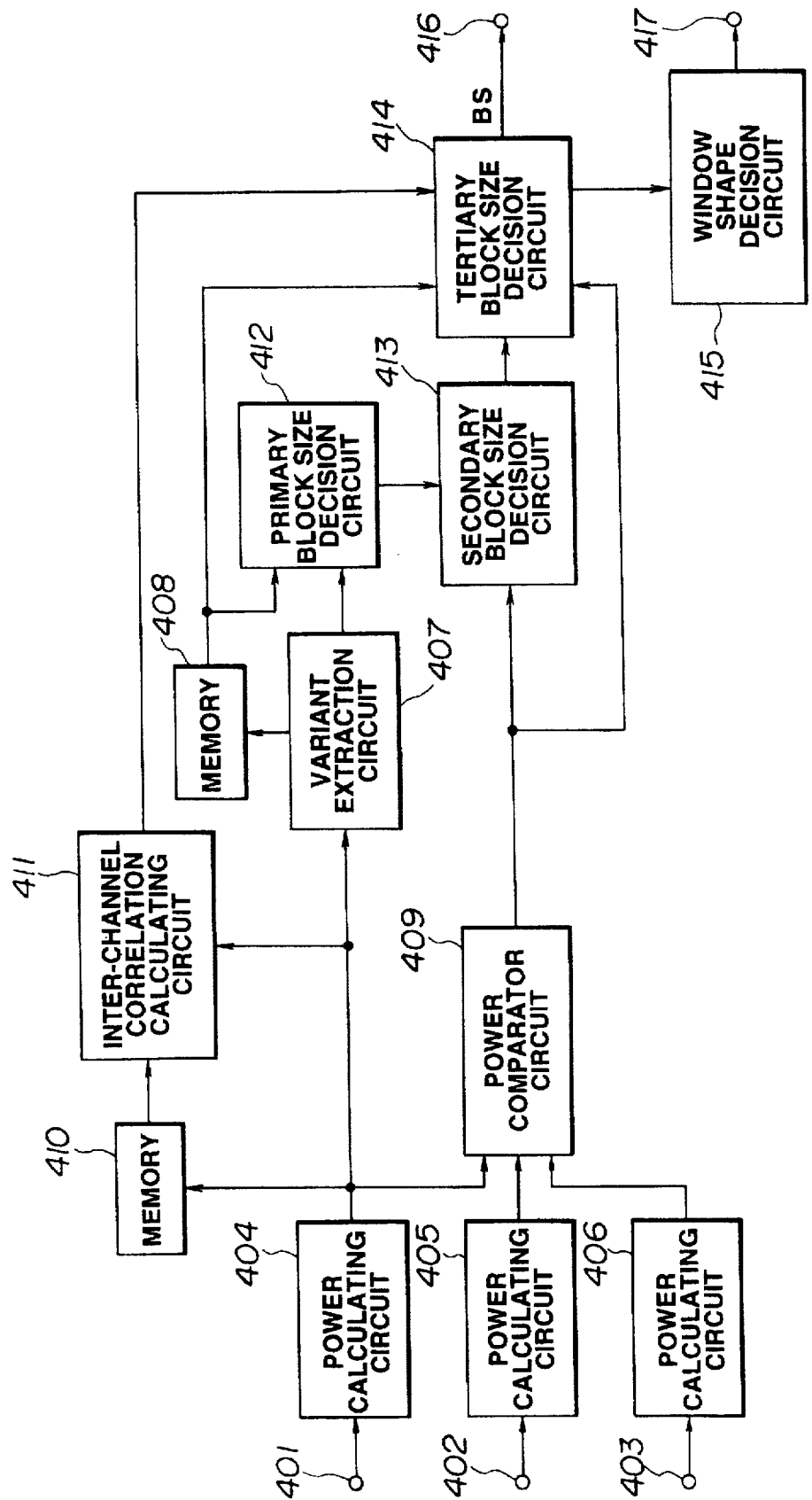
FIG. 4 is a block circuit diagram showing an illustrative arrangement of an orthogonal transform block size decision circuit.

The block size decision circuits 206, 207 and 208 shown in FIG. 2 will now be explained. FIG. 4 shows an illustrative circuit arrangement of the block size decision circuit 206. Among the outputs of the band splitting filter 201 shown in FIG. 2, the signal in the range of from 11 to 22 kHz is fed via an input terminal 401 of FIG. 4 to a power calculating circuit 404. Among the outputs of the band splitting filter 202 shown in FIG. 2, the signal in the range of from 5.5 to 11 kHz is fed via an input terminal 402 of FIG. 4 to a power calculating circuit 405, while the signal in the range of from 0 to 5.5 kHz is fed via an input terminal 403 of FIG. 4 to a power calculating circuit 406.

Meanwhile, the operation of the block size decision circuits 207, 208 shown in FIG. 2 is the same as that of the block size decision circuit 206, with the difference being solely that input signals to input terminals 401, 402 and 403 differ from those with the block size decision circuit 206. That is, in the block decision circuit 207 of FIG. 2, the signal in the range of from 5.5 kHz to 11 kHz from the band splitting filter 202 of FIG. 2 is supplied to the input terminal 401 of FIG. 4. Similarly, the signal in the range of from 11 kHz to 22 kHz from the band splitting filter 201 is supplied to the input terminal 402 of FIG. 4, while the signal in the range of from 0 to 5.5 kHz from the band splitting filter 202 is supplied to the input terminal 403 of FIG. 4. In the block decision circuit 208 of FIG. 2, the signal in the range of from 0 to 5.5 kHz from the band splitting filter 202 of FIG. 2 is supplied to the input terminal 401 of FIG. 4, while the signal in the range of from 11 kHz to 22 kHz from the band splitting filter 201 is supplied to the input terminal 403 of FIG. 4. The signal in the range of from 5.5 to 11 kHz from the band splitting filter 202 of FIG. 2 is supplied to the input terminal 403 of FIG. 4. The block size decision circuits 206 to 208 are provided for each channel. Meanwhile, the block size decision circuits 206 to 208 may be provided for one channel only for determining the orthogonal transform block size for plural channels.

Referring to FIG. 4, the power calculating circuits 404, 405 and 406 integrate the input time-axis waveform signals for a preset time for calculating the power for the respective frequency ranges. The integration time needs to be smaller than the smallest of the above-mentioned orthogonal transform block sizes. Alternatively, the absolute value of the maximum amplitude or the mean amplitude value within the minimum time width of the orthogonal transform block size may be employed as a representative power. The power information, an output of the power calculating circuit 404, is supplied to a memory 410, a inter-channel correlative coefficient calculating circuit 411, a variant extraction circuit 407 and to a power comparator circuit 409. The power information from the power calculating circuits 405, 408 is fed to the power comparator circuit 409. Meanwhile, the power calculating circuits 404, 405 and 406 may be provided on the channel basis so that the power information or the respective channels will be calculated in the power calculating circuits 404, 405 and 406 for the respective channels.

The variant extraction circuit 407 differentiates the power information supplied from the power calculating circuit 404 in order to find a differentiation coefficient which is supplied as the power variant information to a primary block size decision circuit 412 and a memory 408. The memory 408 stores the power variant information supplied from the variant extraction circuit 407 for a time duration not less than the maximum time for the above-mentioned orthogonal transform block size. The reason is that the temporally neighboring orthogonal transform blocks affect one another by the windowing for orthogonal transform and hence the primary block size decision circuit 412 is in need of the power variant information for a directly temporally previous block.

Based upon the power variant information of a block under consideration, supplied from the variant extraction circuit 407, and the power variant information for the block directly temporally previous to the block under consideration, supplied from the memory 408, the primary block size decision circuit 412 determines the orthogonal transform block size of the frequency band under consideration from time change of the power within the frequency band under consideration. Specifically, the primary block size decision circuit 412 selects a temporally shorter orthogonal transform block size if, for example, a time change in excess of a certain threshold value is noticed. Although the threshold may be fixed without becoming ineffective, it may be set so as to be proportional to frequency so that a temporally shorter orthogonal transform block size is selected for a larger time change for the high frequency range and a temporally shorter orthogonal transform block size is selected for a smaller time change for the low frequency range, for utmost effects. The orthogonal transform block size thus determined is fed to a secondary block size decision circuit 413.

On the other hand, the power comparator circuit 409 compares the power information data of the respective frequency bands supplied from the power calculating circuits 404, 405 and 408 for a time length for which the concurrent masking effect is produced in order to find the effect on the output frequency band of the power calculating circuit 404 of the other frequency band, and transmits the resulting masking information to the secondary block size decision circuit 413.

The secondary block size decision circuit 413 corrects the orthogonal transform block size from the primary block size decision circuit 412 so as to become a temporally longer block size, based upon the masking information supplied from the power comparator circuit 409, and transmits the corrected orthogonal transform block size to a tertiary block size decision circuit 414. That is, the secondary block size decision circuit 413 corrects the orthogonal transform block size by taking advantage of the fact that, if the pre-echo raises the problem in the frequency band under consideration, but if there is any signal of a larger amplitude in an other frequency band, above all, in a frequency range lower than the frequency band under consideration, the pre-echo may not be obstructive to the hearing sense, or the ill effect by the pre-echo may be diminished. Meanwhile, the masking means a phenomenon in which a signal becomes inaudible by another signal due to psychoacoustic characteristics of the human hearing system. The masking effect is classified into a time-axis masking effect by time-domain signals and a concurrent masking effect by a frequency-domain signal. By the masking effect, any noise present in a masked portion becomes inaudible. Thus, with actual audio signals, the noise in the masked portion is handled as not being obstructive to the human hearing system.

The inter-channel correlative coefficient calculating circuit 411 calculates the correlative coefficient of the power between neighboring channels, using the power information from plural channels from the memory 410 and the power calculating circuit 404.

Specifically, the memory 410 is used for supplying the power information of plural channels occurring at the same time point as the block under consideration to the inter-channel correlative coefficient calculating circuit 411. That is, the power information data of plural channels are supplied temporally consecutively to the memory 410 from the power calculating circuit 404. In the case of two-channel stereo signals, for example, the power information data for the left channel of the block under consideration, the power information data for the right channel of the block under consideration, the power information data for the left channel of a block temporally neighboring to the block under consideration and the power information data for the right channel of the block temporally neighboring to the block under consideration, are consecutively supplied in this order from the power calculating circuit 404 to the memory 410. The memory 410 holds the power information data of the respective channels in order to output the power information data of the respective channels of the block concurrent to the block under consideration. Thus the memory 410 has a storage capacity proportionate to the number of channels. If the memory 410 for two channels has a capacity C, a capacity Cn of the memory 410 for n channels is found from the equation (1):

$$Cn=(n-1)C \quad (1)$$

The inter-channel correlative coefficient calculating circuit 411 is fed with the power information data of one or plural channels stored in the memory 410 and the one-channel power information data from the power calculating circuit 404 not stored in the memory 410 in order to calculate the correlative coefficient of the power information data of the respective channels concurrent with the block under consideration. If the number of channels is two, for example, the correlative coefficient r may be defined by the equation (2):

$$r = \frac{1}{(n-1)SxSy} \sum_{i=b}^{n} (Xi - Ax)(Yi - Ay) \quad (2)$$

where Xi is the power information of the left channel, Yi is the power information of the left channel, Ax is a mean value of Xi, Ay is a mean value of Yi, Sx is a standard deviation of Xi and Sy is a standard deviation of Yi.

In general, the value of the correlative coefficient E is such that $-1 \leq r \leq +1$, so that, if Xi and Yi are correlated to each other to a larger extent, the value of r is closer to +1, whereas, if Xi and Yi are correlated with each other to a lesser extent, the value of r is closer to −1. In the above equation (2), b is an integer determining the number of blocks taken into account, that is the time range. Although the value of b may be fixed without becoming ineffective, it is more effective for the value b to be proportionate to the frequency, in such a manner that the difference between b and n becomes larger and smaller for the lower frequency range and for the higher frequency range, respectively. Ax and Ay are mean values of the power information data comprised between b and n. If the number of channels is three or more, the correlative coefficient is found for the totality of possible pairs and a mean value of the correlative coefficients is found as an output of the inter-channel correlative coefficient calculating circuit 411. The number of the totality of the possible pairs is {N{N−1}}/2, if the number of channels is N.

The tertiary block size decision circuit 414 then re-checks the orthogonal transform block size, as determined by the secondary block size decision circuit 413, based upon the correlative coefficient r as found by the inter-channel correlative coefficient calculating circuit 411, the masking information as found by the power comparator circuit 409 and the power information of the orthogonal transform block temporally neighboring and directly previous to the orthogonal transform block under consideration, as held by the memory 408, and ultimately determines the orthogonal transform block size of the orthogonal transform block under consideration.

Specifically, the correlative coefficient r sent from the inter-channel correlative coefficient calculating circuit 411 is a value ranging from −1 to +1. The closer the value of the coefficient, the higher is the correlation between channels.

Figure 3A:
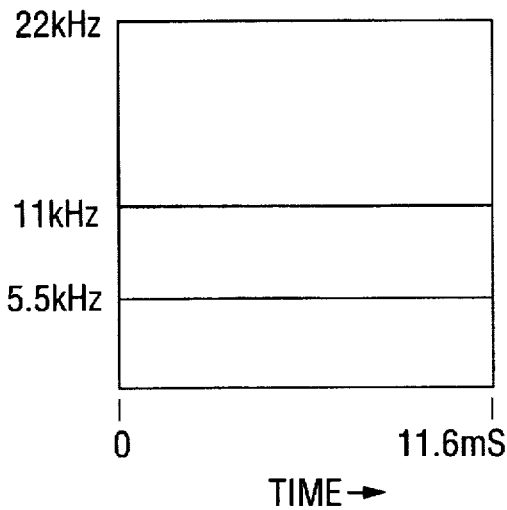
FIGS. 3A to 3D illustrate an arrangement of an orthogonal transform block for bit compaction.
Figure 3B:
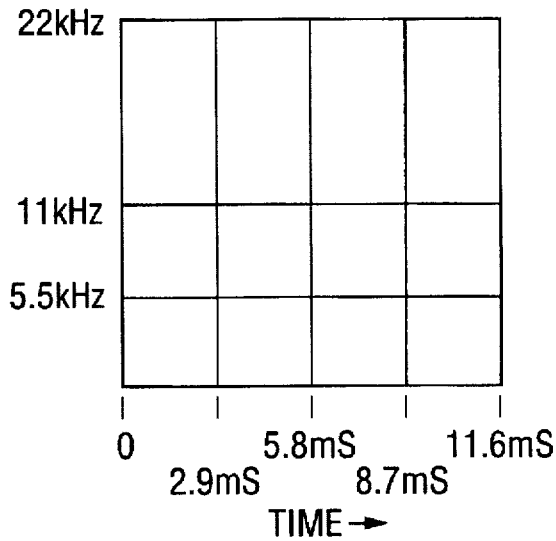
Figure 3C:
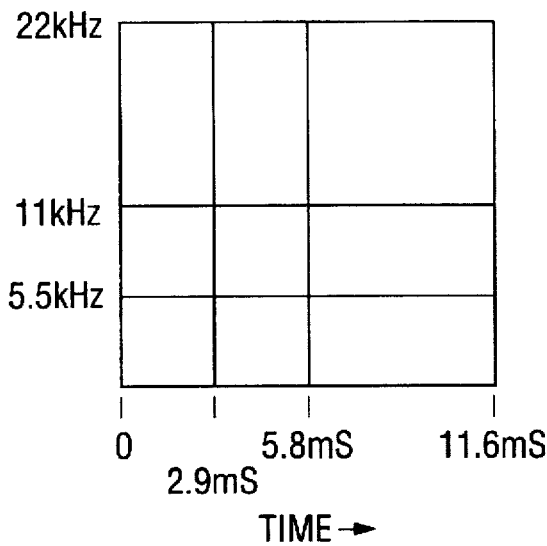
Figure 3D:
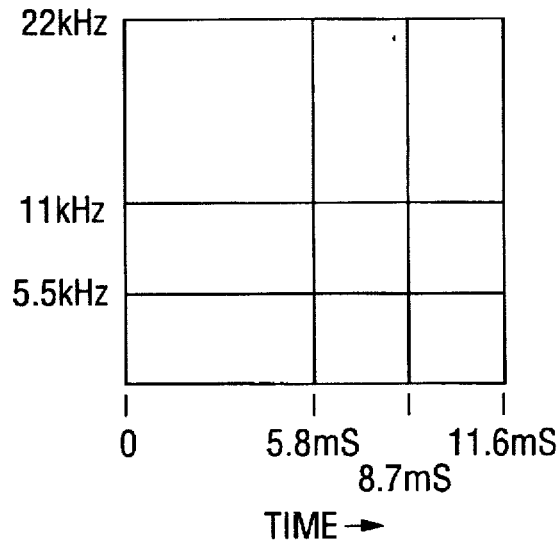

Thus, if the correlation coefficient exceeding a threshold as set by the tertiary block size decision circuit 414 enters it, the concurrent masking effect can be expected, and the power information has a value exceeding a certain threshold value, the tertiary block size decision circuit 414 unanimously sets the concurrent orthogonal transform block sizes of the plural channels to a longer value, for example, to e.g., 11.6 mS which is the value for the long mode shown in FIG. 3A. On the other hand, if the correlative coefficient has a value larger than a pre-set threshold, the concurrent masking effect cannot be expected and the power information from the memory 408 has a value smaller than a certain threshold, the tertiary block size decision circuit 414 unanimously sets the concurrent orthogonal transform block sizes of the plural channels to a shorter value, for example, to a value equal to that of the short mode shown in FIG. 3B. Although the above threshold values may be fixed without becoming ineffective, the threshold values may be variable depending on the frequency for utmost effects.

The values of the power information data of the respective channels may be compared to one another in the inter-channel correlative coefficient calculating circuit 411, in place of finding the correlative coefficient. If the number of channels is two, the absolute value of the difference of the power information data is found. If the number of channels is three or more, the absolute values of the differences of the totality of possible pairs and the mean value thereof is found. The resulting value is transmitted to the tertiary block size decision circuit 414.

The tertiary block size decision circuit 414 determines the size of the orthogonal transform block under consideration, based upon the difference of the power information data as found by the inter-channel correlative coefficient calculating circuit 411, masking information as found by the power comparator circuit 409 and the power information of a directly temporally previous block as held on the memory 408. For example, if the difference of the power information data has a value lower than a certain threshold value, concurrent masking effect can be expected and the power information of a directly temporally previous orthogonal transform block assumes a value larger than a certain threshold value, the tertiary block size decision circuit 414 unanimously sets the size of the concurrent orthogonal transform blocks of plural channels to a longer value, such as a value equal to the value for the long mode shown in FIG. 3A. On the other hand, if the difference of the power information data has a value lower than a certain threshold value, concurrent masking effect cannot be expected and the power information of a directly temporally previous orthogonal transform block assumes a value smaller than a certain threshold value, the tertiary block size decision circuit 414 unanimously sets the size of the concurrent orthogonal transform blocks of plural channels to a small value, such as a value equal to the value for the short mode shown in FIG. 3B. Although the above threshold values may be fixed without becoming ineffective, the threshold values may be variable depending on the frequency for utmost effects.

The size of the orthogonal transform block BS, as determined by the block size decision circuit 414, is outputted at an output terminal 416 to the MDCT circuit 203 shown in FIG. 2, while being supplied to a window shape decision circuit 415. The window shape decision circuit 415 determines the window shape based upon the size of the orthogonal transform block BS.

Figure 5A:
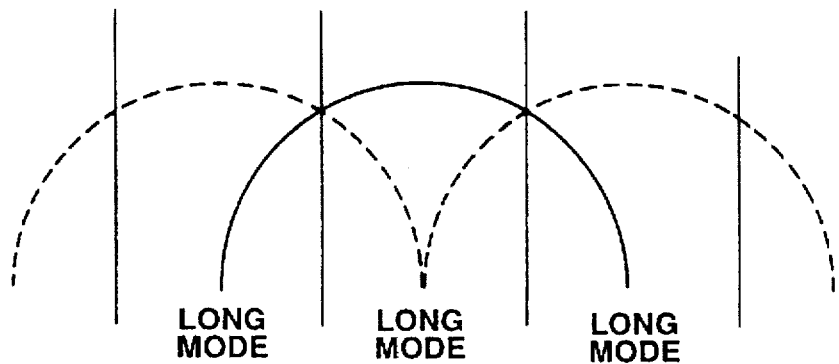
FIGS. 5A to 5C illustrate the relation between variations in time lengths of temporally neighboring orthogonal transform blocks and the window shape employed for orthogonal transform.
Figure 5B:
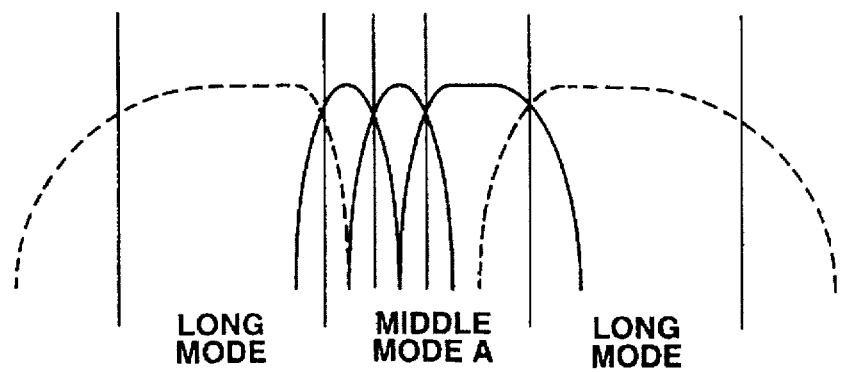
Figure 5C:
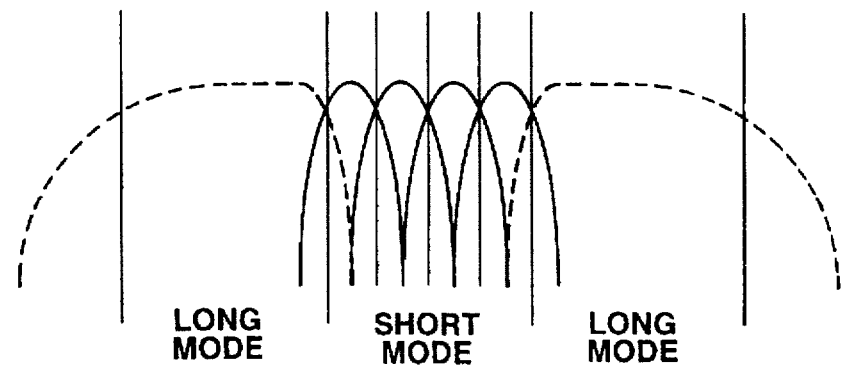

FIG. 5 shows adjacent blocks and window shapes. The windows employed in the orthogonal transform have portions overlapping between neighboring blocks. In the present embodiment, the windows have portions overlapping with neighboring blocks as far as the mid points thereof. Thus the window shape is changed depending upon the size of the neighboring orthogonal transform blocks.

Figure 6:
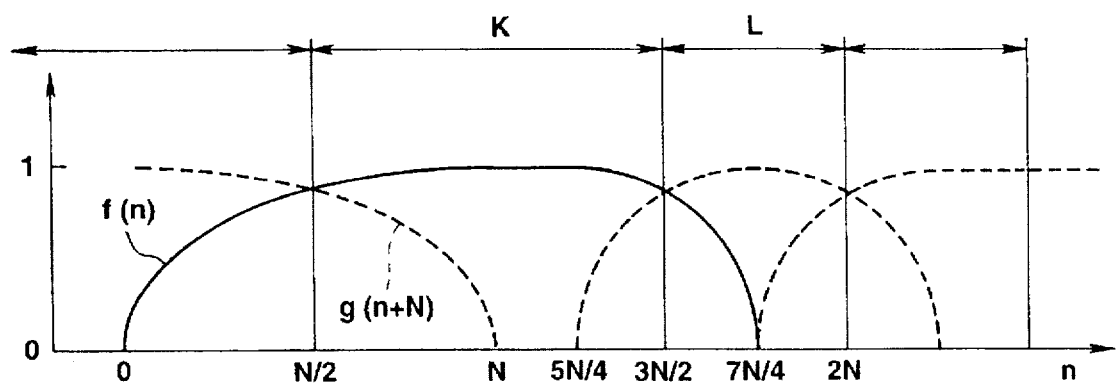
FIG. 6 shows a detailed example of the shape of a window employed for orthogonal transform.

FIG. 6 shows details of the above window shape. In this figure, the window functions f(n) and g(n+N) are given as functions satisfying the following equations (3) and (4):

$$f(n)f(L-1-n)=g(n)g(L-1-n) \quad (3)$$

$$f(n)f(n)+g(n)g(n)=1 \quad (4)$$

$$0 \leq n \leq L-1$$

In the above equation (3), L becomes the orthogonal transform block size if the neighboring orthogonal transform block sizes are equal to each other. However, if the neighboring orthogonal transform block sizes are different, the window functions are given, for the non-overlapping window area, by the equations (5) and (6):

$$f(n)=g(n)=1 \quad (5)$$

$$K \leq n \leq 3K/2-L/2$$

$$f(n)=g(n)=0 \quad (6)$$

$$3K/2+L \leq n \leq 2K$$

where L and K denote the orthogonal transform block size of a shorter time duration and the orthogonal transform block size of a longer time duration, respectively. Thus the frequency resolution in orthogonal transform may be improved by setting the length of the overlapping window portion to as long a value as possible. It is seen from the above description that the shape of the window employed for orthogonal transform is determined after determining the temporally consecutive three orthogonal block sizes.

Meanwhile, the power calculating circuits 405,408 and the power comparator circuit 409 shown in FIG. 4 may be omitted from the block size decision circuits 206, 207 and 208 shown in FIG. 2. In addition, the secondary block size decision circuit 413 and/or the tertiary block size decision circuit 414 shown in FIG. 4 may be omitted from the block size decision circuits 206, 207 and 208. The abovementioned constitution with a small delay may be effectively employed in an example of application in which processing delay is not desirable.

On the other hand, in the tertiary block size decision circuit 414, the time durations of all of the concurrent processing blocks may be selected to be equal by setting the threshold values to a lower value. This is particularly effective for an input signal having high inter-channel correlation.

The illustrative operation of the primary block size decision circuit 412, secondary block size decision circuit 413 and the tertiary block size decision circuit 414 will now be explained.

It is assumed that the signals in the respective bands are sine waves, and that the signal level (amplitude) in the range of 11 kHz to 22 kHz of an input signal shown in FIG. 7A is equal to the signal level (amplitude) in the range of 11 kHz to 22 kHz of an input signal shown in FIG. 7B, as shown for example in FIGS. 7A and 7B.

First, if the orthogonal transform block size of a block N under consideration is determined solely by amplitude changes in the frequency band under consideration, the orthogonal transform block size is selected to be equal for the input signal shown in FIG. 7A and that shown in FIG. 7B. However, if the signals in the bands of 0 to 5.5 kHz or 5.5 kHz to 11 kHz are taken into consideration, since the power of the signal in a band other than the band of 11 kHz to 22 kHz, is lower than that in the band of 11 kHz to 22 kHz, the pre-echo occurring in the band of 11 kHz to 22 kHz is not masked and presents a problem in connection with the human auditory sense. Thus, in the present embodiment, the orthogonal transform block size of a shorter time duration is selected for the block N of the band of from 11 to 22 kHz for the input signal shown in FIG. 7A.

Conversely, with the input signal shown in FIG. 7B, the power of a signal in the band of 0 to 5.5 kHz or the band from 5.5 kHz to 11 kHz is of a value sufficient to mask the pre-echo, as compared to the signal power for the band of 11 kHz to 22 kHz, the pre-echo occurring in the band of from 11 kHz to 22 kHz is masked and does not raise a problem in connection with the human auditory sense. Thus, in the present embodiment, emphasis is placed on frequency resolution for the input signal shown in FIG. 7B, and an orthogonal transform block size of a time duration longer than that of the input signal shown in FIG. 7A is employed.

That is, with the present embodiment, different orthogonal block sizes are selected for the input signal shown in FIG. 7A and that shown in FIG. 7B by the power calculating circuits 404, 405 and 406, power comparator circuit 409 and by the secondary block size decision circuit 413 shown in FIG. 4.

It is then assumed that two input signals for a certain band, such as from 11 kHz to 22 kHz, are sine waves, which are increased in level at a different phase, as shown in FIGS. 8A and 8B. It is also assumed that the two input signals are two-channel stereo signals, with the input signal shown in FIG. 8A being a left channel signal and with the input signal shown in FIG. 8B being a right channel signal. Meanwhile, such small phase difference between different channels frequently occurs in stereophonically recorded music signals.

First, if the orthogonal transform block size of a block under consideration N is determined solely by signal amplitude changes, an orthogonal transform block size of a shorter time duration is selected for the input signal shown in FIG. 8A, while an orthogonal transform block size of a longer time duration is selected for the input signal shown in FIG. 8B. These orthogonal block sizes are selected because the relation Da>T>Db holds, where Da in FIG. 8A and Db in FIG. 8B are respective absolute values of the differences between the maximum amplitude in the blocks (N−1) and that in the blocks N and T is a pre-set threshold value, although the differences in the above inequality are small. The result is that, despite the high correlation between the channels of the input signal, the difference in the spectral components or the orthogonal transform coefficients in the respective channels resulting from orthogonal transform differ significantly thus producing significant difference in the sound quality between the channels. For preventing the difference in the sound quality from being produced in case such signal is entered, the orthogonal transform block size of a longer time duration is selected for each channel if the concurrent masking effect or the time-domain masking effect acts for the block under consideration N. Conversely, if the concurrent masking effect or the time-domain masking effect fails to act for the block under consideration N, the orthogonal transform block size of a shorter time duration is selected for each channel, for preventing the difference in the sound quality from being produced between channels.

With the present embodiment, the tertiary block size decision circuit 414 equates the orthogonal transform block sizes of the respective channels for the input signals of high correlation between the channels, as shown in FIG. 8. It is also effective to equate the time durations of the processing blocks of at least two of the totality of channels.

Returning to FIG. 2, the low frequency range spectral data or MDCT coefficient data on the frequency axis, resulting from MDCT by the MDCT circuits 203 to 205, are grouped according to the critical bands. On the other hand, the mid to high range spectral data are grouped according to sub-bands divided from the critical bands in view of block floating. The spectral data of the respective ranges are supplied to adaptive bit allocation encoding circuits 210, 211 and 212. The critical band is the band of noise that can be masked by a pure sound that has the same intensity as the noise and has a frequency in the vicinity of the frequency of the noise. The width of the critical band increases with increase in frequency. The entire frequency spectrum of from 0 to 22 kHz s split into e.g., 25 critical bands.

A bit allocation calculating circuit 209 finds the masking quantity for the critical bands and respective sub-bands, taking into account the so-called masking effect, based upon the spectral data divided into the critical bands and the sub-bands. The bit allocation calculating circuit 209 also calculates the numbers of allocated bits for the respective bands, based upon the masking quantity and an energy peak or signal energy for each critical band and each sub-band. The spectral data or MDCT coefficient data are re-quantized responsive to the numbers of allocated bits allocated to the respective bands by the adaptive bit allocation and encoding circuits 210, 211 and 212. The encoded data are outputted at output terminals 213, 214 and 215.

Figure 9:
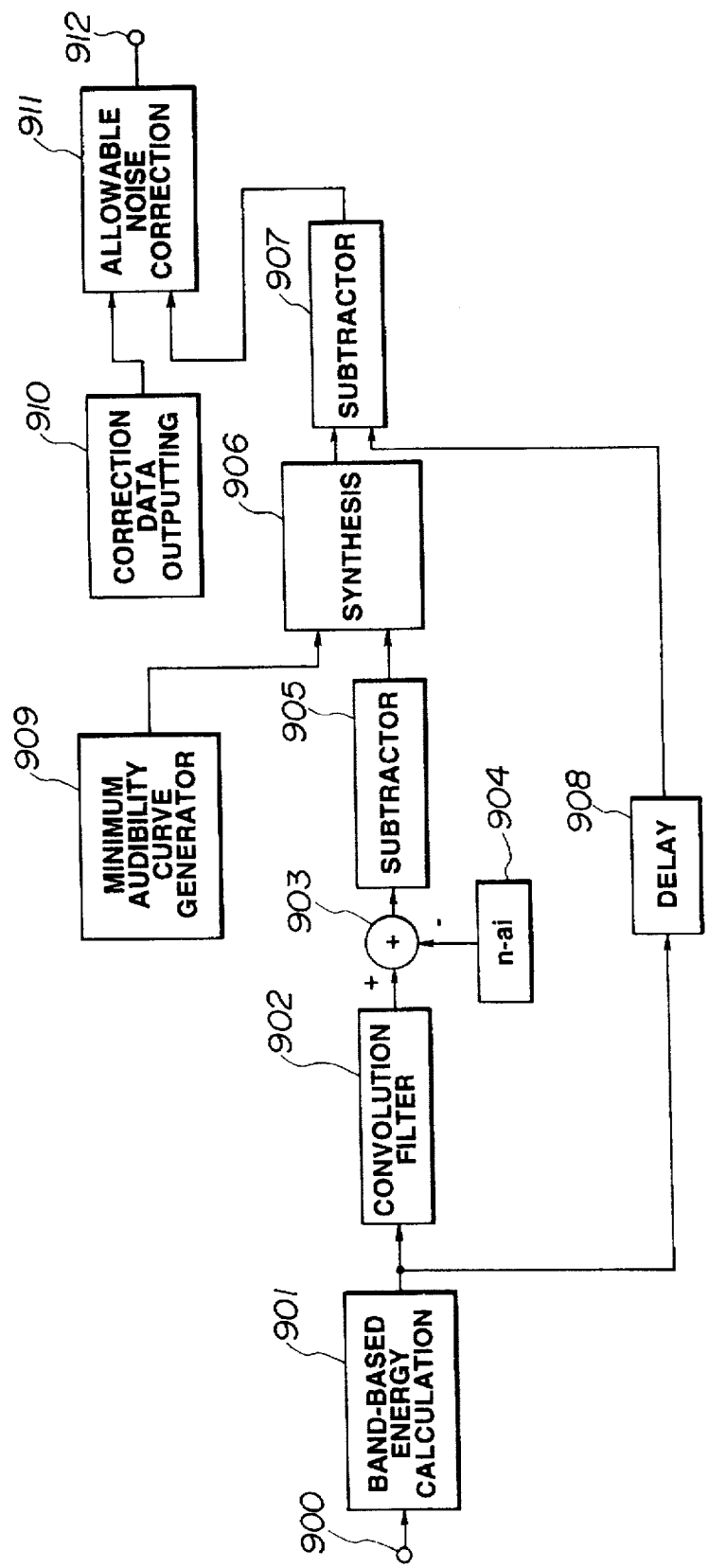
FIG. 9 is a block circuit diagram showing an illustrative arrangement of a bit allocation calculating circuit.

FIG. 9 shows, in a block diagram, an arrangement of an illustrative example of the bit allocation calculating circuit 209.

In this figure, the spectral data or MDCT coefficient data on the frequency axis from the MDCT circuits 203, 204 and 205 are supplied via an input terminal 900 to a band-based energy calculating circuit 901. The energy calculating circuit 901 calculates the sum total of the amplitudes in the respective bands in order to find the energy of the respective critical bands and the sub-bands and the above-mentioned masking quantity. The amplitude peaks or mean values may also be used in place of the band-based energy.

Figure 10:
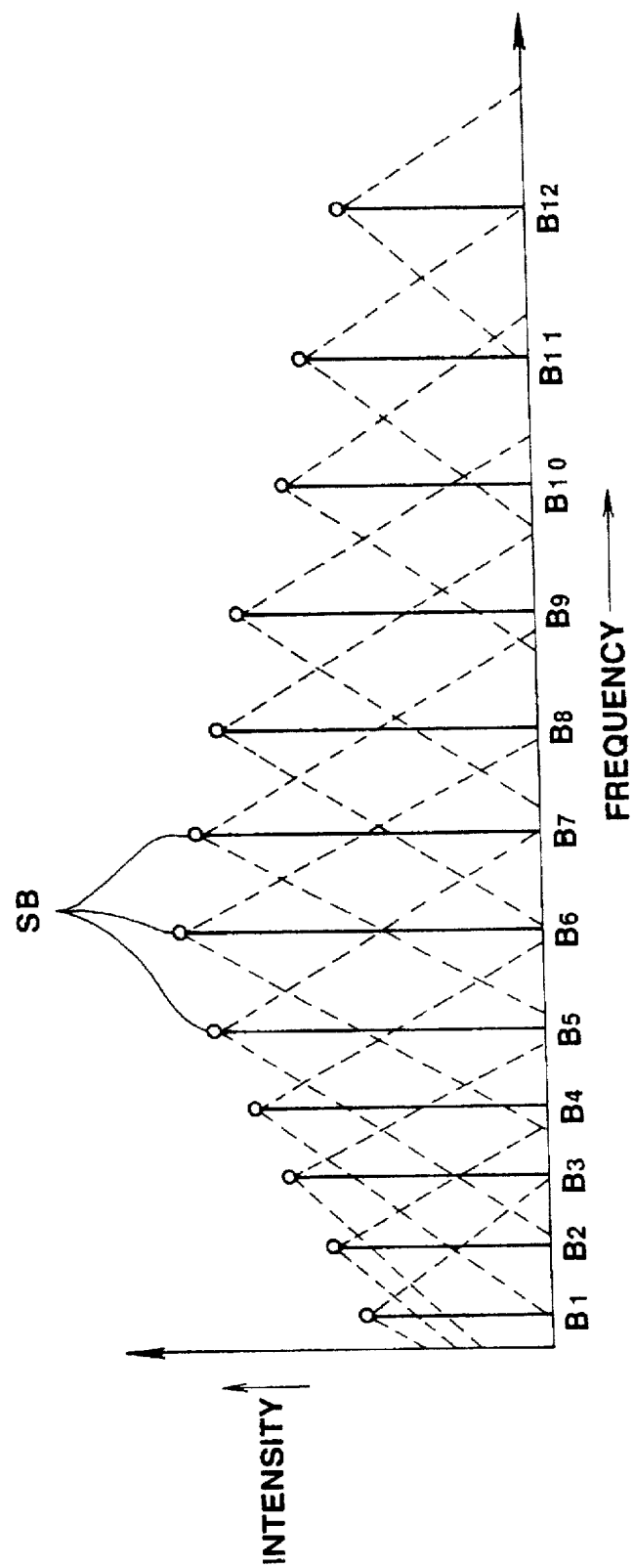
FIG. 10 illustrates the spectrum of critical frequency bands and frequency bands split in view of block floating.
Figure 11:
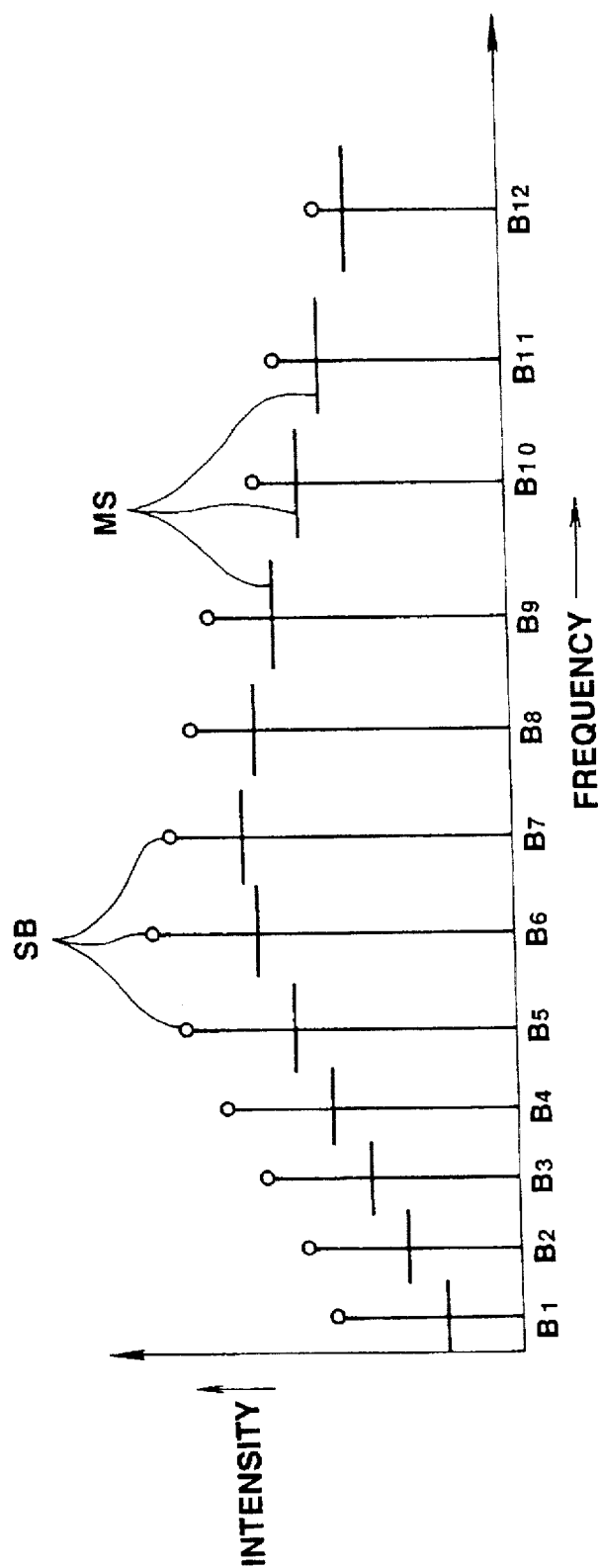
FIG. 11 illustrates the masking spectrum.

As an output of the energy calculating circuit 901, FIG. 10 shows at SB the spectrum of the sums of the respective bands. In FIG. 10, the masking quantity and the sub-bands are denoted as sub-bands are denoted as 12 bands (B1 to B12).

For scrutinizing the effect of the masking on the spectrum SB, the spectral components SB are multiplied by a pre-set weighting function and summed together by way of performing convolution. To this end, band-based outputs of the energy calculating circuit 901 are transmitted to a convolution filter circuit 902. The convolution filter circuit 902 is made up of plural delay elements for sequentially delaying input data, plural multipliers, such as 25 multipliers in association with the respective bands, for multiplying outputs of the delay elements by filter coefficients (weighting functions) and an addition unit for summing the multiplier outputs. By such convolution, the sum of areas denoted by broken lines in FIG. 10 is found.

Only by way of example, outputs of the delay elements are multiplied by a coefficient 1 by a multiplier M for an arbitrary band, a coefficient 0.15 by a multiplier M−1, a coefficient 0.0019 by a multiplier M−2, a coefficient 0.0000086 by a multiplier M+3, a coefficient 0.4 by a multiplier M+1, a coefficient 0.06 by a multiplier M+2 and by a coefficient 0.007 by a multiplier M+3, by way of performing convolution of the spectral components SB, where M is an optional integer of from 1 to 25. It is noted that the above values are only illustrative examples of the multiplication coefficients of the multipliers of the convolution filter circuit 902.

An output of the convolution filter 902 is fed to a subtractive unit 905. The subtractive unit 905 is used for finding a level Q corresponding to the allowable noise level in the convolved area. Meanwhile, the level Q corresponding to the allowable noise level is such a level which becomes the allowable noise level for each critical band as a result of the deconvolution as later explained. The subtractive unit 905 is supplied with a allowance function (a function expressing the masking level) in order to find the level α. The level≧ is controlled by increasing or decreasing the allowance function. The allowance function is supplied from a (n−ai) function generating circuit 904 now to be explained.

If the number of the critical bands as counted from the lower range is denoted as i, the level α, corresponding to the allowable noise level, may be found by the following equation (7):

$$\alpha = S - (n - ai) \tag{7}$$

where n and α are constants, with a >0, and S is intensity of the convolved Bark spectrum. In the equation (7), (n−ai) is the allowance function. In the present embodiment, n=38 and a=1, for which there is no sound quality deterioration and satisfactory encoding may be achieved.

The level a is found in this manner and routed to the subtractive unit 907 via a synthesizing circuit 908. The subtractive unit 907 is fed with an output of the band-based energy calculating circuit 901, that is the above-mentioned spectrum SB, via a delay circuit 908. The subtractive unit 907 subtracts the masking spectrum from the spectrum SB. Thus the portion of the spectrum SB below the level of the masking spectrum MS is masked.

An output of the subtractive unit 907 is taken out via an allowable nose correction circuit 911 and an output terminal so as to be routed to a ROM, not shown, in which the information concerning the allocated bit number is pre-stored. The ROM is responsive to an output obtained from the subtractive unit 907 via the allowable noise correction circuit 911 (the level of a difference between the band-based energy and an output of the noise level setting means) to output the information concerning the number of allocated bits for each band. This information concerning the number of allocated bits for each band is routed to the adaptive bit allocation and encoding circuits 210, 211 and 212 so that the frequency-domain spectral data from the MDCT circuits 203, 204 and 205 will be quantized with the numbers of bits allocated for each band.

In sum, the adaptive bit allocation and encoding circuits 210, 211 and 212 quantize the band-based spectral data with the number of bits allocated responsive to the masking quantity and the level of the difference between the energy of the critical bands and the sub-bands and the output of the noise level setting means. The delay circuit 908 is employed for delaying the spectrum SB from the band-based energy calculating circuit 901 taking into account the delay caused in circuits upstream of the synthesizing circuit 906.

Figure 12:
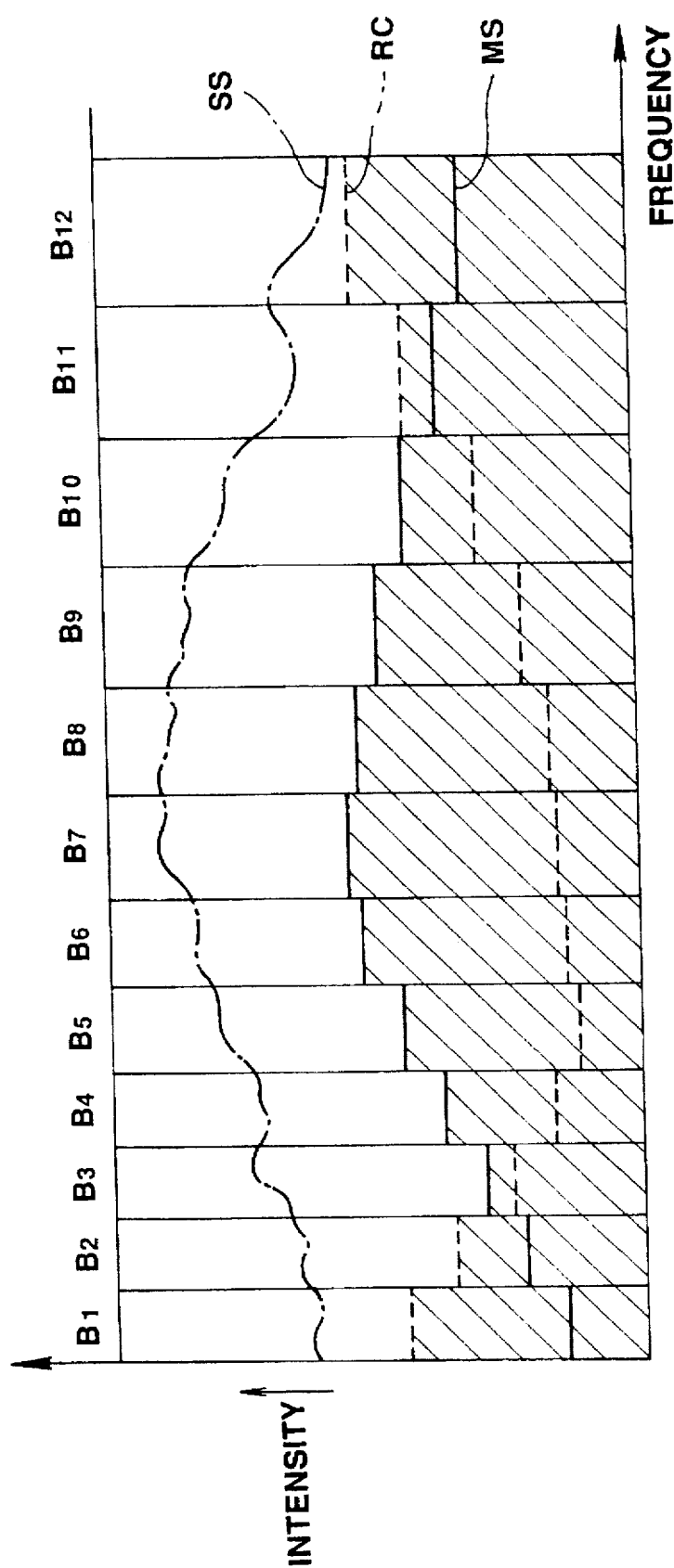
FIG. 12 illustrates synthesis of the minimum audibility curve and the masking spectrum.

Meanwhile, during synthesis by the synthesizing circuit 906, data indicating a so-called minimum audibility curve RC from a minimum audibility curve generating circuit 909, which stands for psychoacoustic characteristics of the human hearing System, as shown in FIG. 12, may be combined with the masking spectrum MS. If the absolute noise level is below the minimum audibility curve, the noise is not heard. The minimum audibility curve becomes different depending on e.g., the playback volume, even for the same coding. However, since there is no marked difference in the manner of music entering e.g., a 16-bit dynamic range, it may be presumed that, if the quantization noise in the frequency range in the vicinity of 4 kHz, which is heard most readily by the ear, is not heard, no quantization noise in any other frequency range which is below the minimum audibility curve is heard. Thus, if it is assumed that the device is used so that the noise in the vicinity of 4 kHz of the word length of the system is not heard, and the allowable noise level is obtained by synthesizing both the minimum audibility curve RC and the masking spectrum MS, the allowable noise level can be set so as to be up to the portion shown shaded in FIG. 12. In the present embodiment, the 4 kHz level of the minimum audibility curve is matched to the lowest level corresponding to e.g. 20 bits. Meanwhile, the signal spectrum SS is also shown in FIG. 12.

The allowable noise correction circuit 911 also corrects the allowable noise level in the output of the subtractive unit 907 based upon the information of e.g., an equi-loudness curve supplied from a correction information outputting circuit 910. The equi-loudness curve is a characteristic curve concerning the psychoacoustic characteristics of the human auditory system. The equi-loudness curve, also termed an equi-loudness sensitivity curve, is obtained on connecting points of the sound pressure of tones at various frequencies heard with the same loudness as the pure tone at 1 kHz. The equi-loudness curve delineates a curve substantially equal to a minimum audibility curve RC shown in FIG. 12. In the equi-loudness curve, the sound near 4 kHz is heard with the same loudness as the sound at 1 kHz despite the sound pressure being lower by 8 to 10 dB than that at 1 kHz. Conversely, the sound near 50 Hz cannot be heard with the same loudness as the 1 kHz sound unless the sound pressure is higher by about 15 dB than that at 1 kHz. Thus it is seen that the noise exceeding the level of the minimum audibility curve (allowable noise level) preferably has frequency characteristics represented by a curve conforming to the equi-loudness curve. From this it follows that correction of the allowable noise level in consideration of the equi-loudness curve is suited to the psychoacoustic characteristics of the human auditory system.

It is possible for the correction information outputting circuit 910 to correct the allowable noise level based upon the information between the detection output of the quantization output data quantity at the adaptive bit allocation and encoding circuits 210 to 212 and the target bit rate of the ultimate encoded data. Specifically, there may be instances wherein the total number of bits resulting from previous transient adaptive bit allocation to the totality of the unit bit allocation blocks has an error with respect to a constant bit rate (target value) determined by the bit rate of the ultimate encoded output data. In these instances, bit allocation is again carried out for reducing the error to zero. That is, if the total number of allocated bits is smaller than the target value, the number of bits corresponding to the difference is additively allocated to the unit blocks. Conversely, if the total number of allocated bits is larger than the target value, the number of bits corresponding to the difference is subtractively allocated to the unit blocks.

To this end, the correction information outputting circuit 910 detects an error of the total number of bits from the target value, and outputs correction data for correcting the number of bit allocation responsive to the error data. If the error data indicates shortage in he number of bits, a larger number of bits has been used per unit block so that the data volume is in excess of the target value. Conversely, if the error data indicates excess in the number of bits, a smaller number of bits per unit block suffices, so that the data volume is smaller than the target value.

Thus the correction information outputting circuit 910 outputs data of the above correction value for correcting the allowable noise level in the output of the subtractive unit 907 based e.g., on the information data of the equi-loudness curve. The allowable noise level from the subtractive unit 907 is corrected by the above correction value being supplied to the allowable noise correction circuit 911. In the above-described system, the data resulting from processing the orthogonal transform output spectrum by the subsidiary information, as the main information, and the scaling factor indicating the state of the block floating and the word length data indicating the word length, as the subsidiary information, are obtained, and transmitted from the encoder to the decoder.

Figure 13:
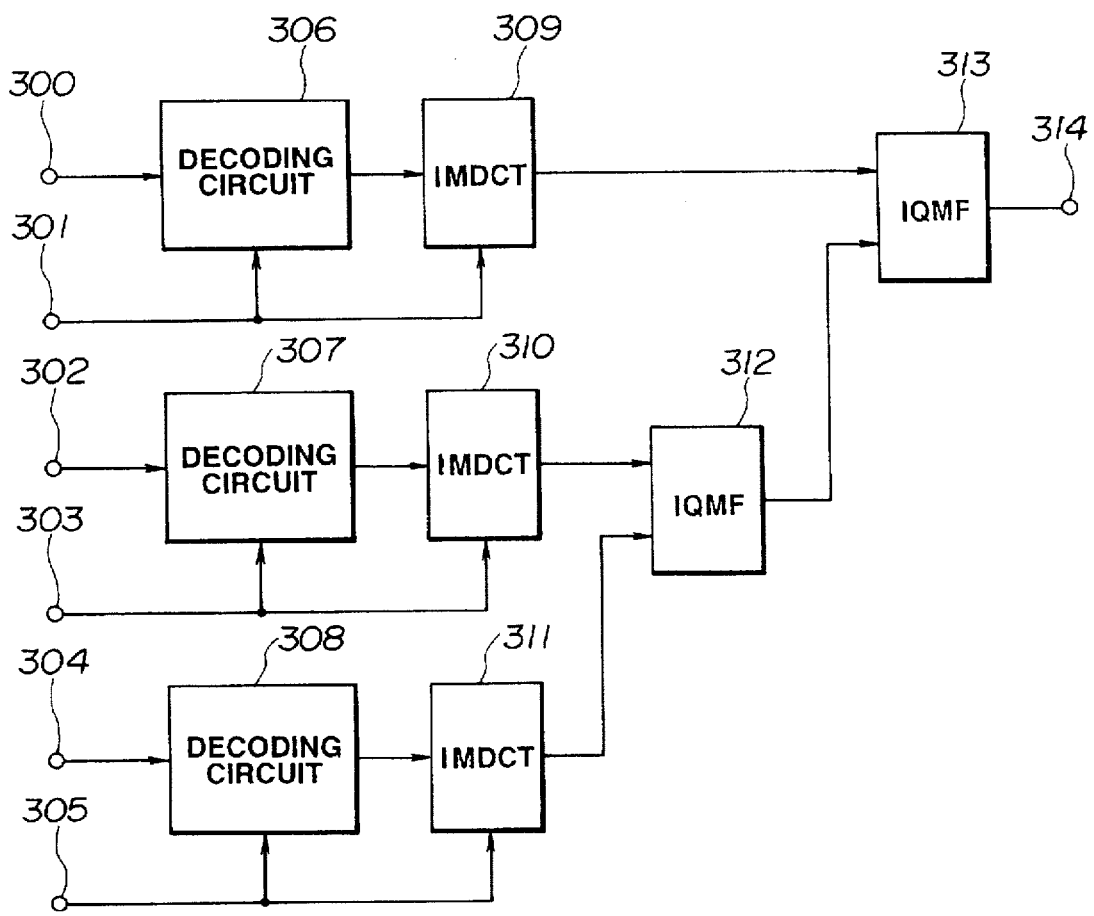
FIG. 13 shows the ATC decoder shown in FIG. 1.

FIG. 13 shows the ATC decoder 73 shown in FIG. 1, that is an illustrative constitution of a decoding circuit for re-decoding signals from the above-described high efficiency encoding. The band-based quantized MDCT coefficients, that is data equivalent to output signals at the output terminals 213, 214 and 215 in FIG. 2, are supplied at input terminals 300, 302 and 304 to decoding circuits 306, 307 and 308, while the information on the orthogonal transform block size in use, that is data equivalent to output signals at output terminals 216, 217 and 218 in FIG. 2, are supplied to decoding circuits 306, 307 and 308. The decoding circuits 306, 307 and 308 cancel the bit allocation using the adaptive bit allocation data. The signal on the frequency axis are then transformed by IMDCT circuits 309, 310 and 311 into signals on the time axis. The time-domain signals of the partial ranges are decoded into a full range signal by IMQF circuits 312 and 313 so as to be outputted via an output terminal 314 to a D/A converter 74 shown in FIG. 1.

The present invention is not limited to the above-described embodiments. For example, the recording/reproducing medium need not be integrated to the other recording/reproducing medium and may be interconnected via a data transfer network. The present invention may also be adapted to a signal processing apparatus for processing digital speech signals or digital video signals, in addition to the audio PCM signals. The above-mentioned synthesis of the minimum audibility curve may also be omitted, in which case the minimum audibility curve generating circuit 909 and the synthesis circuit 908 in FIG. 9 may be omitted and the output of the subtractive unit 905 may be directly supplied to the subtractive unit 907.

Also a wide variety of bit allocation techniques may be employed. In the simplest case, the fixed bit allocation may be employed. In addition, simple bit allocation based on the band-based energy or the combination of fixed bit allocation and variable bit allocation may be employed.

From the foregoing it is seen that the present invention provides an arrangement in which, if, when the time length of the orthogonal transform block and the window shape are changed with respect to acute amplitude changes in the input signal, some correlation is found to exist between the channels, the same time length may be employed for the orthogonal transform blocks of the respective channels for suppressing the difference in the sound quality between channels for improving a fixed sound image position feeling and satisfactory sound quality. This realizes a more satisfactory sound quality for the same bit rate. In addition, the same sound quality may be obtained with a lower bit rate.

That is, the present invention provides means for determining time length of the processing blocks which is psychoacoustically desirable for compacting temporally fluctuated information signals, thereby enabling high efficiency compaction and expansion with a higher sound quality.

What is claimed is:

1. A method for processing signals indicative of information, in which each of at least two input signals is divided into processing blocks having lengths adaptively changed in response to characteristics of said input signals so that information compaction can be carried out on the input signals on a processing block basis, wherein the input signals determine at least two channels of the information and each of the input signals determines a different one of the channels, said method including the step of:

setting the lengths of the processing blocks for each of the input signals such that, when there is high correlation between portions of the input signals the processing blocks for said portions of said input signals are of at least substantially equal lengths.

2. The method of claim 1, wherein the processing blocks for at least two of the input signals are set to be of equal length at each instant of time of high correlation between said at least two of the input signals.

3. The method of claim 1, including the step of:

checking correlation between at least two of the input signals and setting the length of the processing blocks for said at least two of the input signals to be of at least substantially equal length only when the correlation is found to be high.

4. The method as claimed in claim 3 wherein the correlation is checked based upon at least one of: determining at least one correlative coefficient by processing at least a portion of each of said at least two of the input signals, and comparing signals indicative of power, energy or energy peak of said at least two of the input signals.

5. The method as claimed in claim 4 wherein the correlation is checked by processing one of the processing blocks of a first one of said at least two of the input signals and portions of each other one of said at least two of the input signals, said portions determining each of the processing blocks concurrent with said one of the processing blocks.

6. The method as claimed in claim 4 wherein the correlation is checked based upon determining at least one correlative coefficient by processing a processing block of each of said at least two of the input signals and another processing block of each of said at least two of the input signals.

7. The method as claimed in claim 4 wherein the lengths of the processing blocks are set to be equal to one another in response to checking the correlation between at least two neighboring processing blocks of a first one of said at least two of the input signals and concurrent processing blocks of another one of said at least two of the input signals.

8. The method as claimed in any one of claims 3, 4, 5, 6, and 7, wherein the correlation is checked using inter-channel correlation coefficients.

9. The method of any one of claims 3, 4, 5, 6, and 7, wherein the steps performed to determine the lengths of the processing blocks are fixed.

10. The method of any one of claims 3, 4, 5, 6, and 7, wherein the steps performed to determine the lengths of the processing blocks are dependent on said at least two of the input signals.

11. The method as claimed in claim 10 wherein the steps performed to determine the lengths of the processing blocks are variable dependent on the frequency content of said at least two of the input signals.

12. The method as claimed in any one of claims 1, 2, 3, and 7, also including the step of:

compacting each of said input signals to generate compacted signals, wherein the step of compacting includes the step of performing an orthogonal transform on said each of said input signals thereby generating a frequency-domain signal wherein not only the orthogonal transform size but also the shape of a windowing function employed for the orthogonal transform is changed in accordance with changes in the lengths of the processing blocks for said each of said input signals.

13. The method as claimed in claim 12 wherein, for dividing the said each of said input signals into plural bands in the frequency domain, the frequency spectrum is first divided into the plural bands, blocks each consisting of plural samples are formed for each of the bands, and the orthogonal transform is carried out for each of said blocks of each of the bands.

14. The method as claimed in claim 13 wherein the width of the bands is selected to be broader with increase in frequency.

15. The method as claimed in claim 14 wherein the widths of the two lowermost frequency bands are at least substantially equal.

16. The method as claimed in claim 15 wherein allocation of at least one of main information and subsidiary information is inhibited for signal components, of at least one of the bands, that are approximately higher than a signal pass band.

17. A recording medium having recorded thereon the compacted signals generated by the method of claim 13.

18. The method as claimed in any one of claims 1, 2, 3, 4, 5, 6, and 7, wherein, when determining the lengths of the processing blocks a boundary value is variable dependent on the amplitude and frequency of each of the input signals.

19. The method of any of claims 1, 2, and 3, also including the steps of:

compacting each of the input signals to generate compacted signals, wherein the step of compacting includes the step of performing an orthogonal transform on said each of the input signals thereby generating a frequency-domain signal wherein not only the orthogonal transform size but also the shape of a windowing function employed for the orthogonal transform is changed in accordance with changes in the lengths of the processing blocks for said each of the input signals; and expanding the compacted signals employing an inverse orthogonal transform for converting each said frequency-domain signal into a time-domain signal.

20. The method as claimed in claim 19 wherein the inverse orthogonal transform is performed on a processing block basis to generate inverse orthogonal transform outputs and the inverse orthogonal transform outputs are synthesized to produce a synthesized time-domain signal.

21. The method as claimed in claim 3, wherein the correlation is checked based at least in part upon differences between power, energy or energy peak of said at least two of the input signals.

22. The method as claimed in claim 3, wherein the correlation is checked by determining at least one inter-channel correlation coefficient by processing at least a portion of each of said at least two of the input signals, and comparing signals indicative of power, energy or energy peak of said at least two of the input signals.

23. The method of claim 3 wherein a degree of a pre-set masking effect responsive to at least one of the input signals is calculated for use in determining the lengths of the processing blocks.

24. The method as claimed in claim 23 wherein the degree of masking is calculated based upon at least one of: changes in at least one of said at least two of the input signals, and power or energy or peak information.

25. A recording medium having compacted information recorded thereon, wherein processing blocks of at least two channels of the information are variable in length in conformity to correlation between input signals indicative of said channels and the channels comprise processing blocks whose lengths that have been determined such that when there is high correlation between portions of the input signals indicative of corresponding portions of said channels, processing blocks for said corresponding portions of said channels are of at least substantially equal lengths.

26. An apparatus for information compaction, comprising
block dividing means for dividing input signals into processing blocks, wherein the input signals determine at least two channels of information, and each of the input signals determines a different one of the channels, wherein the block dividing means is configured to determine lengths of the processing blocks such that when there is high correlation between portions of said input signals, the processing blocks for said portions of said input signals are of at least substantially equal length, and
means for compacting the input signals on a processing block basis.

27. The apparatus as claimed in claim 26 wherein the processing blocks for at least two of the input signals are of equal length at each instant of time of high correlation between said at least two of the input signals.

28. The apparatus of claim 26, wherein the block dividing means includes:

means for calculating correlation between at least two of the input signals and setting the lengths of the processing blocks for said at least two of the input signals to be of at least substantially equal only when the correlation is found to be high.

29. The apparatus of claim 28, wherein the means for calculating correlation comprises change calculating means for calculating at least one of: changes in at least one of said at least two of the input signals, and information on power, energy or peak information, wherein the means for calculating correlation calculates the correlation based on results of calculation by said change calculating means.

30. The apparatus of claims 28 wherein the means for calculating correlation includes means for determining at least one inter-channel correlation coefficient by processing at least a portion of each of said at least two of the input signals, and comparing signals indicative of power, energy or energy peak of said at least two of the input signals.

31. The apparatus, of claim 28, wherein the block division means calculates a degree of a pre-set masking effect responsive to at least one of the input signals for use in determining the lengths of the processing blocks.

32. The apparatus of claim 28, wherein the lengths of the processing blocks are dependent on characteristics of said at least two of the input signals.

33. The apparatus as claimed in claim 26 wherein the means for compacting comprises orthogonal transform means for performing an orthogonal transform on said each of the input signals thereby transforming said each of the input signals into plural bands on the frequency domain.

34. The apparatus of claim 33 wherein a modified cosine transform is employed as the orthogonal transform in the orthogonal transform means.

35. The apparatus as claimed in any one of claims 26 and 27 wherein, when determining the lengths of the processing blocks, dividing means varies a boundary value depending on the amplitude and frequency of each of the input signals.

36. An apparatus for expanding compacted input signals on a processing block basis, wherein the input signals determine at least two channels of compacted information and each of the input signals determines a different one of the channels, wherein length of each processing block is varied responsive to characteristics of the input signals, and each of the input signals is expanded on the basis of concurrent processing blocks of the input signals, each of said concurrent processing blocks having length indicative of correlation between uncompacted signals on which compression was performed to generate said input signal said apparatus comprising expanding means for performing expansion of said each of the input signals to generate variable length output blocks wherein the expansion is a counterpart operation of the compression performed to generate said each of the input signals, and synthesizing means for synthesizing the variable length output blocks generated by the expansion means.

37. A compacted information recording/transmitting apparatus comprising means for dividing input signals into processing blocks, wherein the input signals determine at least two channels of information, and each of the input signals determines a different one of the channels, lengths of the processing blocks being variable responsive to the input signals, with the length of concurrent processing blocks of the input signals being indicative of correlation between said input signals and being at least substantially the same at each instant of time of high correlation between said input signals, information compacting means for compacting the input signals on a processing block basis by pre-set information compaction, thereby generating compacted signals, and recording/transmitting means for recording or transmitting the compacted signals.

* * * * *